(12) United States Patent
Panigrahy et al.

(10) Patent No.: US 7,558,775 B1
(45) Date of Patent: Jul. 7, 2009

(54) METHODS AND APPARATUS FOR MAINTAINING SETS OF RANGES TYPICALLY USING AN ASSOCIATIVE MEMORY AND FOR USING THESE RANGES TO IDENTIFY A MATCHING RANGE BASED ON A QUERY POINT OR QUERY RANGE AND TO MAINTAIN SORTED ELEMENTS FOR USE SUCH AS IN PROVIDING PRIORITY QUEUE OPERATIONS

(75) Inventors: Rina Panigrahy, Sunnyvale, CA (US); Samar Sharma, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1347 days.

(21) Appl. No.: 10/165,590

(22) Filed: Jun. 8, 2002

(51) Int. Cl.
*G06F 7/00* (2006.01)
*G06F 17/30* (2006.01)

(52) U.S. Cl. .............................. 707/1; 707/6
(58) Field of Classification Search .............. 707/1–10, 707/100–104.1, 200–206; 711/108, 212
See application file for complete search history.

(56) References Cited

U.S. PATENT DOCUMENTS

| | | | |
|---|---|---|---|
| 5,088,032 A | 2/1992 | Bosack ....................... 709/242 |
| 5,319,763 A | 6/1994 | Ho et al. ...................... 714/34 |
| 5,481,540 A | 1/1996 | Huang ........................ 370/401 |
| 5,515,370 A | 5/1996 | Rau ............................ 370/399 |
| 5,528,701 A | 6/1996 | Aref ............................ 382/178 |
| 5,651,099 A | 7/1997 | Konsella ....................... 706/13 |
| 5,721,899 A | 2/1998 | Namba ........................ 713/502 |
| 5,740,171 A | 4/1998 | Mazzola et al. ............. 370/392 |
| 5,781,772 A | 7/1998 | Wilkinson, III et al. ........ 707/3 |
| 5,809,501 A | 9/1998 | Noven ............................ 707/7 |
| 5,829,004 A | 10/1998 | Au .............................. 707/100 |
| 5,842,040 A | 11/1998 | Hughes et al. ................ 710/11 |
| 5,848,416 A | 12/1998 | Tikkanen ..................... 707/101 |
| 5,884,297 A | 3/1999 | Noven ..................... 370/395.3 |
| 5,898,689 A | 4/1999 | Kumar et al. ................ 370/232 |

(Continued)

OTHER PUBLICATIONS

Doeringer et al., Routing on longest-matching prefixes, Feb. 1996, vol. 4, IEEE/ACM, 86-97.*

(Continued)

*Primary Examiner*—Jean B Fleurantin
(74) *Attorney, Agent, or Firm*—The Law Office of Kirk D. Williams

(57) ABSTRACT

Sets of ranges typically are maintained using an associative memory and may be used to identify a matching range based on a query point or query range and to maintain sorted elements for use, such as in providing priority queue operations. In one implementation, ranges are added to a set of ranges by determining a longest common prefix of a starting point and an ending point of the range, extending this longest common prefix by appending a bit to create a particular extended longest common prefix, and then storing it in the set of extended longest common prefixes. The set of extended longest common prefixes is then processed based on the query point or range to identify the matching range. Additionally, one implementation uses bands for identifying ranges, where the band is formed from the starting and ending points to the longest common matching prefix of the these points.

70 Claims, 26 Drawing Sheets

U.S. PATENT DOCUMENTS

| | | | | |
|---|---|---|---|---|
| 5,920,857 | A * | 7/1999 | Rishe et al. | 707/3 |
| 5,920,886 | A | 7/1999 | Feldmeier | 711/108 |
| 5,930,359 | A | 7/1999 | Kempke et al. | 713/160 |
| 6,000,008 | A | 12/1999 | Simcoe | 711/108 |
| 6,018,524 | A | 1/2000 | Turner et al. | 370/392 |
| 6,061,368 | A | 5/2000 | Hitzelberger | 370/537 |
| 6,067,574 | A | 5/2000 | Tzeng | 709/247 |
| 6,091,725 | A | 7/2000 | Cheriton et al. | 370/392 |
| 6,097,724 | A | 8/2000 | Kartalopoulos | 370/395.3 |
| 6,115,716 | A | 9/2000 | Tikkanen et al. | 707/100 |
| 6,141,738 | A | 10/2000 | Munter et al. | 711/206 |
| 6,148,364 | A | 11/2000 | Srinivasan et al. | 711/108 |
| 6,219,748 | B1 | 4/2001 | Srinivasan et al. | 711/108 |
| 6,236,658 | B1 | 5/2001 | Essbaum et al. | 370/401 |
| 6,237,061 | B1 | 5/2001 | Srinivasan et al. | 711/108 |
| 6,240,485 | B1 | 5/2001 | Srinivasan et al. | 711/108 |
| 6,243,667 | B1 | 6/2001 | Kerr et al. | 703/27 |
| 6,285,378 | B1 | 9/2001 | Duluk, Jr. | 345/447 |
| 6,289,414 | B1 | 9/2001 | Feldmeier et al. | 711/108 |
| 6,295,576 | B1 | 9/2001 | Ogura et al. | 711/108 |
| 6,298,339 | B1 | 10/2001 | Bjornson | 707/3 |
| 6,308,219 | B1 | 10/2001 | Hughes | 709/238 |
| 6,341,346 | B1 * | 1/2002 | Benayoun et al. | 712/223 |
| 6,377,577 | B1 | 4/2002 | Bechtolsheim et al. | 370/392 |
| 6,430,190 | B1 | 8/2002 | Essbaum et al. | 370/401 |
| 6,434,662 | B1 | 8/2002 | Greene et al. | 711/108 |
| 6,516,383 | B1 * | 2/2003 | Patra et al. | 711/108 |
| 6,564,211 | B1 * | 5/2003 | Andreev et al. | 707/3 |
| 6,725,326 | B1 * | 4/2004 | Patra et al. | 711/108 |
| 6,741,985 | B2 * | 5/2004 | Green | 707/5 |

OTHER PUBLICATIONS

Uga et al., A fast and compact longest match prefix look-up me using pointer cache for every long network address, Oct. 11, 1999, IEEE, 595-602.*

Jagadish et al., On Effective Multi-Dimensional Indexing for String, 2000, ACM, 403-414.*

Amihood Amir et al., Efficient Pattern Matching with Scaling, Jan. 1990, ACM, 344-357.*

Faloutsos C., Gray codes for partial match and range queries, Oct. 1988, IEEE, vol. 14, 1381-1393.*

Apostolico et al., Matching for run-length encoded strings, Jun. 11-13, 1997, IEEE, 348-356.*

Donald R. Morrison, "PATRICIA—Practical Algorithm to Retrieve Information Coded in Alphanumeric," Journal of the ACM, vol. 15, No. 4, Oct. 1968, pp. 514-534.

Waldvogel et al., "Scalable High Speed IP Routing Lookups," Proc. SIGCOMM '97, ACM, 1997, pp. 25-36.

Lampson et al., "IP Lookups Using Multiway and Multicolumn Search," Proc. Infocom 98, Mar. 1998, 24 pages.

V. Srinivasan and George Varghese, "Faster IP Lookups using Controlled Prefix Expansion," ACM SIGMETRICS Performance Evaluation Review, vol. 26 No. 1, Jun. 1998, p. 1-10.

Stefan Nilsson and Gunnar Karlsson, "Fast Address Look-up for Internet Routers," Proceedings of IEEE Broadband Communications, Apr. 1998, 12 pages.

William N. Eatherton, Hardware-Based Internet Protocol Prefix Lookups, Master's thesis, Sever Institute, Washington University, St. Louis, MO, May 1999, 109 pages.

Lampson et al., "IP Lookups Using Multiway and Multicolumn Search," IEEE Transactions on Networking, vol. 7, No. 3, Jun. 1999, pp. 324-334.

Lockwood et al., "Field Programmable Port Extender (FPX) for Distributed Routing and Queuing," Proceedings of the ACM/SIGDA international symposium on Field programmable gate arrays, Feb. 2000, pp. 137-144.

Ruiz-Sanchez et al., "Survey and Taxonomy of IP Address Lookup Algorithms," IEEE Network Magazine, vol. 15, No. 2, Mar./Apr. 2001, pp. 8-23.

Pankaj Gupta and Nick McKewon, "Algorithms for Packet Classification," IEEE Network Magazine, vol. 15, No. 2, Mar./Apr. 2001, pp. 24-32.

Iyer et al., "ClassiPI: An Architecture for Fast and Flexible Packet Classification," IEEE Network Magazine, vol. 15, No. 2, Mar./Apr. 2001, pp. 33-41.

Waldvogel et al., "Scalable High Speed Prefix Matching," ACM Transactions on Computer Systems, vol. 19, No. 4, Nov. 2001, pp. 440-482.

Devavrat Shah and Pankaj Gupta, "Fast Incremental Updates on Ternary-CAMs for Routing Lookups and Packet Classification," Proc. Hot Interconnects VIII, Aug. 2000, Stanford. IEEE Micro, vol. 21, No. 1, Jan./Feb. 2001, 9 pages.

Waldvogel et al., "Scalable Best Matching Prefix Lookups," PODC 98, ACM 1998.

Radia Perlman, Interconnections: Bridges, Routers, Switches, and Internetworking Protocols, Second Edition, Addison-Wesley, 2000, pp. 347-365.

Pankaj Gupta and Nick McKeown, "Algorithms for Packet Classification," IEEE Network Special Issue, Mar./Apr. 2001, vol. 15, No. 2, pp. 24-32 (reprint 29 pages).

Srinivasan et al., "Packet Classification Using Tuple Space Search," ACM Computer Communication Review, 1999, ACM SIGCOMM'99, Sep. 1999 (12 pages).

Srinivasan et al., "Fast and Scalable Layer Four Switching," ACM Computer Communication Review, 28(4):191-202, 1998. ACM SIGCOMM'98, Sep. 1998 (12 pages).

Stefan Nilsson and Gunnar Karlsson, "IP-Address Lookup Using LC-Tries," IEEE Journal on Selected Areas in Communications, Jun. 1999 (12 pages).

* cited by examiner

INSERT(S,T)

SEARCH(V)

DELETE(S,T)

POINT LOOKUP(P)

**INSERT POINT(P)

**DELETE POINT(P)

**INSERT RANGE (S,T)

**DELETE RANGE (S,T)

RANGE SEARCH (X,Y)

```
// SIDE IS 0 IF IT IS LEFT SIDE, ELSE 1      /- 520
SUBROUTINE_INSERT (R, LEN, SIDE) {
    V = POINT_LOOKUP(R)
    P = LONGEST_COMMON_PREFIX(R, V)
    INSERT P0, P1 IN THE TCAM CLASS C0 AND C1 RESPECTIVELY
    IF NEWLY INSERTED THEN INITIALIZE ALL THEIR COUNTS TO 0
    P0->Q = MIN(V, R)
    P1->Q = MAX(V, R)
    P = R
    WHILE (P = LONGEST LCP MATCHING R OF LENGTH LESS THAN P)
        AND (LENGTH(P)-1 >= LEN ) {
        P->COUNT[SIDE]++;
        BIT B = 0 IF (P->Q < R), 1 OTHERWISE
        IF (B == LAST BIT OF P)
            P->Q = R
        IF (LENGTH(P)-1 > LEN) AND (LAST BIT OF P != SIDE) {
            P' = P WITH LAST BIT INVERTED
            LOOKUP P'
            IF IT EXISTS THEN
                INCREMENT ITS TCOUNT
            IF (TCOUNT == 1)
                INSERT P' IN C2
        }
    }
}

/- 525
INSERT (S, T) {
    P = LONGEST_COMMON_PREFIX (S, T);
    SUBROUTINE_INSERT (S, LENGTH(P), RIGHT);
    SUBROUTINE_INSERT (T, LENGTH(P), LEFT);
}
```

INSERT RANGE (S,T)
FIGURE 5B

```
PI_POINT_LOOKUP (P) {                    / 530
    ELCP0 = LOOKUP P IN CLASS C0
    IF (ELCP0 EXISTS) AND (P >= ELCP0->Q)
        THEN RETURN ELCP0
    ELCP1 = LOOKUP P IN CLASS 1
    IF (ELCP1 EXISTS) AND (P <= ELCP1->Q)
        THEN RETURN ELCP1
}
                                         / 535
SEARCH (X) {
    ELCP = PI_POINT_LOOKUP(X)
    IF (X <= ELCP->Q) AND (ELCP->COUNT[LEFT] > 0) THEN
        RETURN TRUE
    ELSEIF (X >= ELCP->Q) AND (ELCP->COUNT[RIGHT] > 0)
        RETURN TRUE
    ELSE {
        LOOKUP X IN CLASS C3
        IF (HIT) RETURN TRUE
```

SEARCH (X)
FIGURE 5C

```
SUBROUTINE_DELETE (R, LEN, SIDE) {  ← 540
    P = LONGEST ELCP MATCHING R OBTAINED BY DOING 2 LOOKUPS
IN C0 AND C1
    P->COUNT[SIDE]--
    IF(P->COUNT[LEFT]==0 && P->COUNT[RIGHT]==0) {
        D = (SIBLING_OF_P)->Q
        DELETE P FROM TCAM;
        DELETE SIBLING OF P FROM TCAM;
    }

P = R;
    WHILE (P = LONGEST ELCP MATCHING R OF LENGTH LESS THAN P)
AND (LENGTH(P)-1 >= LEN ) {
        P->COUNT[SIDE]--;
        IF (P->Q == R)
            P->Q = D;
        IF (LENGTH(P)-1 > LEN) AND (LAST BIT OF P != SIDE) {
            P' = LOOKUP SIBLING OF P
            DECREMENT P'->TCOUNT
            IF (P'->TCOUNT == 0) THEN
                DELETE P' FROM CLASS C2
        }
    }
}

DELETE (S, T) {  ← 545
    LCP = LONGEST_COMMON_PREFIX(S, T);
    SUBROUTINE_DELETE (S, LENGTH(LCP), RIGHT);
    SUBROUTINE_DELETE (T, LENGTH(LCP), LEFT);
}
```

DELETE RANGE (S,T)
FIGURE 5D

ELEMENT LOOKUP(P)

INSERT ELEMENT(P)

DELETE ELEMENT(P)

QUEUE OPERATIONS

ADD VALUE(P) TO ASSOCIATIVE MEMORY

LOOKUP VALUE(P) IN ASSOCIATIVE MEMORY

RANGE SEARCH (X,Y)

US 7,558,775 B1

METHODS AND APPARATUS FOR MAINTAINING SETS OF RANGES TYPICALLY USING AN ASSOCIATIVE MEMORY AND FOR USING THESE RANGES TO IDENTIFY A MATCHING RANGE BASED ON A QUERY POINT OR QUERY RANGE AND TO MAINTAIN SORTED ELEMENTS FOR USE SUCH AS IN PROVIDING PRIORITY QUEUE OPERATIONS

FIELD OF THE INVENTION

This invention relates to computer and communications systems; and more particularly, the invention relates to maintaining sets of ranges typically using an associative memory and for using these ranges to identify a matching range based on a query point or query range and to maintain sorted elements for use such as in providing priority queue operations.

BACKGROUND OF THE INVENTION

The communications and computer industries are rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP).

A network device, such as a switch or router, typically receives, processes, and forwards or discards a packet based on one or more criteria, including the type of protocol used by the packet, addresses of the packet (e.g., source, destination, group), and type or quality of service requested. Additionally, one or more security operations are typically performed on each packet. But before these operations can be performed, a packet classification operation must typically be performed on the packet.

Known approaches of packet classification include using custom application-specific integrated circuits (ASICs), custom circuitry, software or firmware controlled processors, binary and ternary content-addressable memories (CAMs). A ternary CAM (TCAM) is a special type of fully associative memory which stores data with three logic values: '0', '1' or '*' (don't care). Each TCAM entry includes a value and a mask. These entries are stored in the TCAM in decreasing order of priority, such as in a decreasing order of the length of prefixes. For a given input, the TCAM compares it against all of the entries in parallel, and returns the entry with the highest priority that matches the input lookup word. An entry matches the input lookup word if the input and the entry value are identical in the bits that are not masked out. A TCAM provides a fast mechanism for performing a longest matching prefix of a particular value, but natively does not provide a mechanism for directly performing operations on ranges.

In performing packet classification, a determination is often made whether a field of a packet matches a range of values. For example, a router may need to filter or only allow packets having a source or destination port number within a particular range of port numbers. Especially when processing packets, this operation typically needs to be performed very efficiently at typically at a line speed rate. Another application that typically relies on range search operations includes coordinating access to computer-readable medium, such as a disk or memory. In this exemplary application, the processing of the packet or data may be limited by the rate at which a range operation is performed.

Additionally, sorting and range search problems are commonly encountered in several other applications, including the general locking problem. For example, in a distributed storage networking environment, many devices might be accessing shared data at very high speeds. These accesses are typically protected by locking the address range being accessed, with each specific location checked to see if it available or is already being accessed by another device before it can be accessed for certain functions. More generally, before locking a range, a check should be made to see if any address in the range overlaps with ranges being accessed by other devices. These sets of ranges changes dynamically as new locks are added and old ones are released. Other high speed applications of locking include memory protection, time range locks, SCSI reserve in a multi-host environment, locking memory accesses between processes, and locking accesses to a shared memory in case of multiprocessor environments. Range search is also useful in memory management to ensure that processes access only the allocated ranges of memory.

The demand on mechanisms for identifying a matching range and its use is changing as new applications are developed, especially with increasing processing rates and volume of range operations performed on a dynamic set of ranges. In the computing works, sorting and priority queue operations are commonly encountered and need to be performed at high speeds. Needed are methods and apparatus for maintaining sets of ranges and for determining a matching range based on a query point or query range.

SUMMARY OF THE INVENTION

Methods and apparatus are disclosed for maintaining sets of ranges typically using an associative memory and for using these ranges to identify a matching range based on a query point or query range. In one embodiment, these set of ranges correspond to elements which are maintained in sorted order, and upon which, priority queue and/or other operations may be performed. In one embodiment, an associative memory natively supporting prefixes is used to identify a longest matching prefix; while in one embodiment, prefixes are encoded in entries of an associative memory, such as a binary content-addressable memory (CAM), with series of lookup operations being performed until the matching entry (e.g., longest matching prefix) is identified.

In one embodiment, a matching range is determined based on a query point. Ranges are added to a set of ranges by determining a longest common prefix of a starting point and an ending point of the range, extending the longest common prefix by appending a bit to create a particular extended longest common prefix, and then storing it in the set of extended longest common prefixes. The set of extended longest common prefixes is then processed based on the query point to identify the matching range.

One embodiment uses bands in identifying whether a query point falls within a range. Ranges are added to a set of ranges by determining a longest common prefix of a starting point and an ending point of the range. A first portion of a band from the starting point to the longest common prefix is identified, as well as a second portion of the band from the ending point to the longest common prefix. One or more right counts and left counts are adjusted based on the first and second portions of the bands. The longest common prefix is extended by appending a bit to create a particular extended longest common prefix, and it is stored in a set of extended longest common prefixes. The set of extended longest common prefixes can then be processed based on the query point to identify the range.

In one embodiment, a matching range is determined based on a query range. Ranges are added to a set of ranges by determining a longest common prefix of a starting point and an ending point of the range, extending the longest common prefix by appending a bit to create a particular extended longest common prefix, and storing it in a set of extended longest common prefixes. The set of extended longest common prefixes is then processed based on the query range to identify the matching range.

The range matching and/or sorting methods and apparatus disclosed herein can be used for an unlimited number of applications, including, but not limited to packet classification, memory protection, process scheduling, general scheduling algorithms, locking memory accesses between processes, locking accesses to a shared memory in case of multiprocessor environments, time range locks, SCSI reserve in a multi-host environment, admission control/quality of service with arbitrary granularity, Layer4-Layer7 switching, caching/scheduling algorithms in disks, Layer 2 aging, maintaining statistics for ranges.

BRIEF DESCRIPTION OF THE DRAWINGS

The appended claims set forth the features of the invention with particularity. The invention, together with its advantages, may be best understood from the following detailed description taken in conjunction with the accompanying drawings of which:

FIGS. 5B-D illustrate pseudo code of processes used in one embodiment for identifying a matching range based on a query point;

DETAILED DESCRIPTION

Figure 1A:
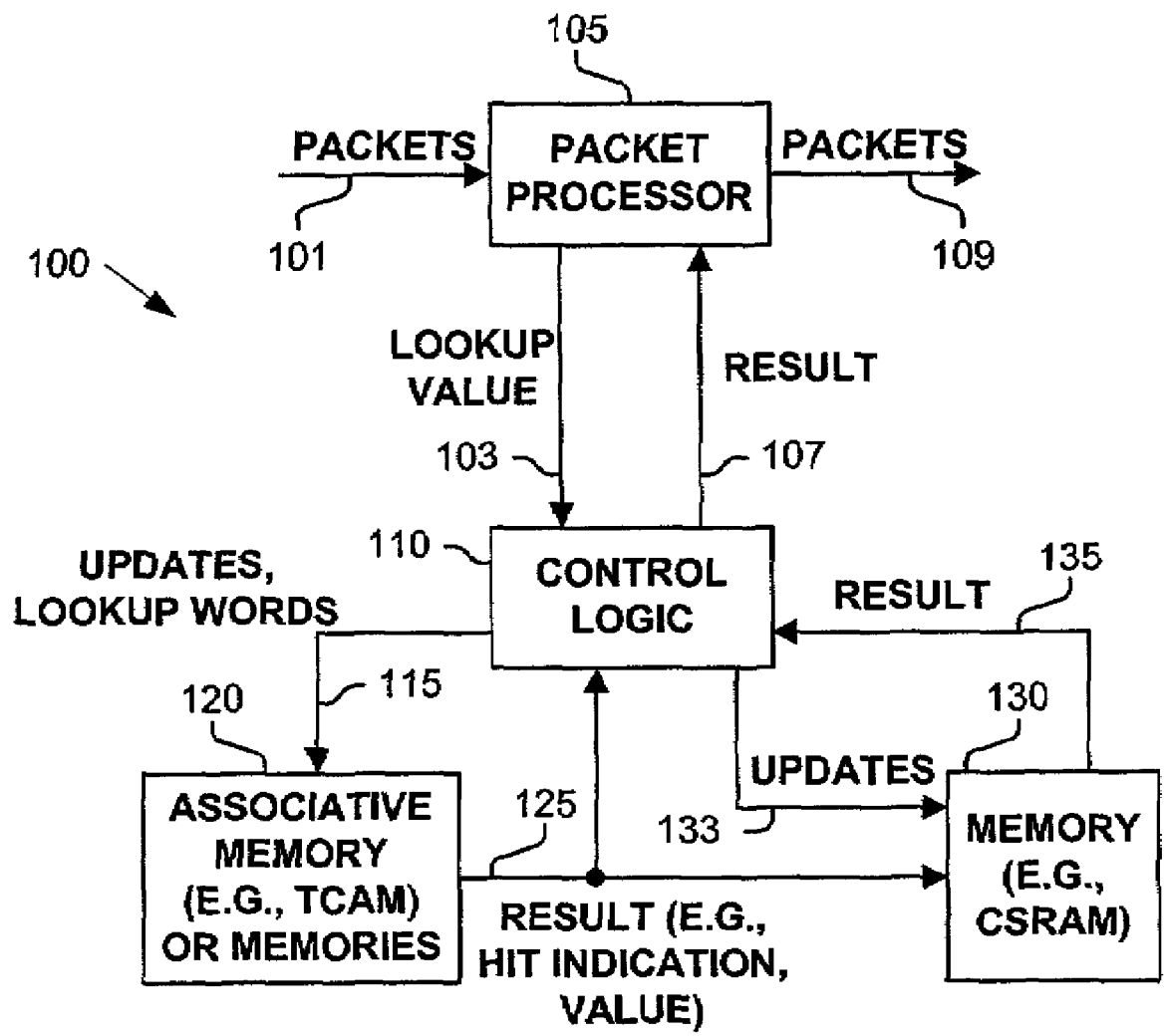
FIG. 1A is a block diagram of a system used in one embodiment for maintaining and operating on sets of ranges.

Systems and methods are disclosed for maintaining sets of ranges typically using an associative memory and for using these ranges to identify a matching range based on a query point or query range and to maintain sorted elements for use such as in, but not limited to providing priority queue operations. Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable medium containing instructions. The embodiments described hereinafter embody various aspects and configurations within the scope and spirit of the invention, with the figures illustrating exemplary and non-limiting configurations.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or identification of a packet. Moreover, these packets may contain one or more types of information, including, but not limited to, voice, data, video, and audio information. The term "item" is used herein to refer to a packet or any other unit or piece of information or data. The phrases "processing a packet" and "packet processing" typically refer to performing some steps or actions based on the packet, and which may or may not include modifying and/or forwarding the packet.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may be performed in the same or in a different serial or parallel ordering and/or by different components and/or processes, threads, etc., and/or over different connections and be combined with other functions in other embodiments in keeping within the scope and spirit of the invention.

Moreover, the terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc.

The term "storage mechanism" includes any type of memory, storage device or other mechanism for maintaining instructions or data in any format. "Computer-readable medium" is an extensible term including any memory, storage device, and/or other storage mechanism tangibly embodying computer-readable instructions and/or data. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed a processing element and/or control logic, and data which is manipulated a processing element and/or control logic. The term "data structure" is an extensible term referring to any data element, variable, data structure, data base, and/or one or more or an organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc. The term "associative memory" refers to all types of associative memories, including, but not limited to binary and ternary content-addressable memories, hash tables, TRIE and other data structures, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before the another, but rather provides a mechanism to distinguish between particular units. Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modify or not modifying the coupled signal or communicated information. The term "subset" is used to indicate a group of all or less than all of the elements of a set. Moreover, the term "or" is used herein to identify an alternative selection of one or more, including all, of the conjunctive items.

Overview

Sorting, searching and maintaining priority queue are basic operations that need to be done at very high speeds in several applications. The methods and apparatus disclosed herein can be used for an unlimited number of applications, including, but not limited to packet classification, memory protection, process scheduling, general scheduling algorithms, locking memory accesses between processes, locking accesses to a shared memory in case of multiprocessor environments, time range locks, SCSI reserve in a multi-host environment, admission control/quality of service with arbitrary granularity, Layer4-Layer7 switching, caching/scheduling algorithms in disks, Layer 2 aging, maintaining statistics for ranges. In addition, range matching is useful in memory management to ensure that processes access only the allocated ranges of memory, including when virtual to physical mapping is used.

Methods and apparatus are disclosed for maintaining sets of ranges typically using an associative memory and for using these ranges to identify a matching range based on a query point or query range and to maintain sorted elements for use such as in, but not limited to providing priority queue operations. In one embodiment, ranges are added to a set of ranges by determining a longest common prefix of a starting point and an ending point of the range, extending this longest common prefix by appending a bit to create a particular extended longest common prefix, and then storing it in the set of extended longest common prefixes. The set of extended longest common prefixes is then processed based on the query point or range to identify the matching range. Additionally, one embodiment uses bands for identifying ranges, where the band is formed from the starting and ending points to the longest common matching prefix of the these points. In one embodiment, an associative memory natively supporting prefixes is used to identify a longest matching prefix; while in one embodiment, prefixes are encoded in entries of an associative memory, such as a binary content-addressable memory (CAM), with series of lookup operations being performed until the matching entry (e.g., longest matching prefix) is identified.

FIG. 1A illustrates one embodiment of a system 100, which may be part of a router or other communications or computer system, for maintaining sets of ranges typically using an associative memory and for using these ranges to identify a matching range based on a query point or query range and to maintain sorted elements for use such as in, but not limited to providing priority queue operations. Control logic 110 identifies a matching range or corresponding element. In one embodiment, control logic 110 programs, updates and performs lookup operations on associative memory or memories 120 with classes of associative memory entries by providing updates and lookup words 115. In one embodiment, control logic 110 includes custom circuitry, such as, but not limited to discrete circuitry, ASICs, memory devices, processors, etc. Control logic 110 also stores results (e.g., nodes, routing information, etc.) via updates 133 in memory or memories 130. A hit result 125 is typically provided to control logic 110 and to memory or memories 130, which produces result 135 (e.g., an indication of a corresponding matching range). In one embodiment, a single chip or ASIC contains system 100. In one embodiment, a single chip or ASIC contains system 100 except for packet processor 105. In one embodiment, less than all, even no two components, of system 100 reside on the same chip or ASIC.

In one embodiment, packets 101 are received by packet processor 105. In addition to other operations (e.g., packet routing, security, etc.), packet processor 105 typically generates one or more items, including, but not limited to one or more netflow identifiers (typically referred to herein as "netflows") based on one or more fields of one or more of the received packets 101 and possibly from information stored in data structures or acquired from other sources. Packet processor 105 typically generates a lookup value 103 which is provided to control logic 110 for deriving a lookup word 115 and performing one or more associative memory lookup operations on associative memory or memories 120. A result 107 (e.g., a next routing hop) is typically returned to packet processor 105, and in response, one or more of the received packets are manipulated and forwarded as indicated by packets 109.

Figure 1B:
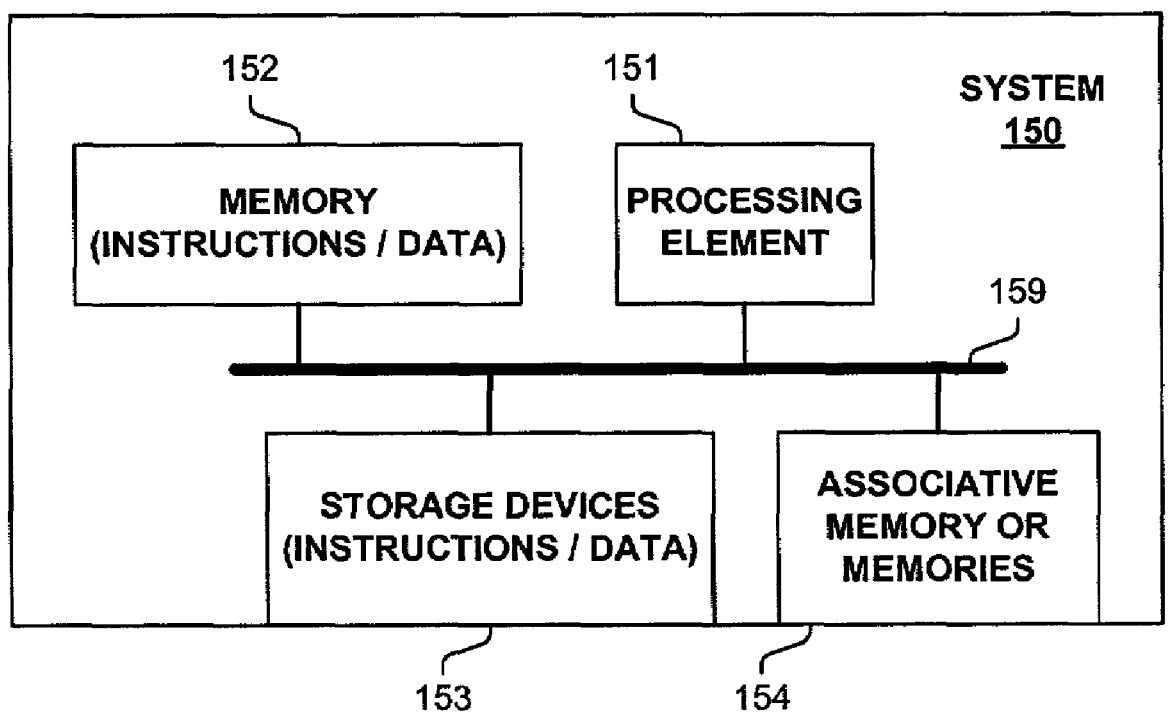
FIG. 1B is a block diagram of a system used in one embodiment for maintaining and operating on sets of ranges.

FIG. 1B illustrates one embodiment of a system, which may be part of a router or other communications or computer system, for maintaining sets of ranges typically using an associative memory and for using these ranges to identify a matching range based on a query point or query range and to maintain sorted elements for use such as in, but not limited to providing priority queue operations. In one embodiment, system 150 includes a processing element 151, memory 152, storage devices 153, and associative memory or memories 154, which are coupled via one or more communications mechanisms 159 (shown as a bus for illustrative purposes).

Various embodiments of system 150 may include more or less elements. In one embodiment, a single chip or ASIC contains system 150. In one embodiment, less than all, even no two components, of system 150 reside on the same chip or ASIC.

The operation of system 150 is typically controlled by processing element 151 using memory 152 and storage devices 153 to perform one or more tasks or processes, such as programming or performing a lookup operation on associative memory or memories 154. Memory 152 is one type of computer-readable medium, and typically comprises random access memory (RAM), read only memory (ROM), flash memory, integrated circuits, and/or other memory components. Memory 152 typically stores computer-executable instructions to be executed by processing element 151 and/or data which is manipulated by processing element 151 for implementing functionality in accordance with one embodiment of the invention. Storage devices 153 are another type of computer-readable medium, and typically comprise solid state storage media, disk drives, diskettes, networked services, tape drives, and other storage devices. Storage devices 153 typically store computer-executable instructions to be executed by processing element 151 and/or data which is manipulated by processing element 151 for implementing functionality in accordance with one embodiment of the invention.

Point Intersection for Disjoint Ranges

In one embodiment, a matching range is determined based on a query point and prefix matching. The longest common prefix of any two points S and T, denoted by LCP(S,T) can readily be determined as it is the longest series of leading bits which are the same for both S and T. Given a range R=[S,T], the longest common prefix P for range R is determined by taking the longest common prefix of its starting endpoint S and its ending endpoint T. Moreover, the points P01 . . . 1 and P10 . . . 0 must be present in the range, which implies that for a set of disjoint ranges, the longest common prefix for each range is unique. A point X is said to match a longest common prefix P if P is a prefix of X. A query point X that belongs to a range must match the longest common prefix for that range.

In one embodiment, the set of longest common prefixes are divided into two classes of prefixes by extending the prefix by one bit, and then maintaining the extended prefixes ending in the same bit value in the same class. For example, for a longest common prefix P, the one-extended prefix is P1 and the zero-extended prefix is P0. If a point X matches an longest common prefix P, then it must match either the zero-extended or one-extended prefix for ranges of length two or greater. In one embodiment, ranges of length one (e.g., point ranges) are stored in their corresponding class based on its last bit, as such there is only one entry for ranges of length one. The points on the left part of the range match the one-extended longest common prefix, and the points on the right part of the range match the zero-extended longest common prefix. For disjoint ranges, if query point X is contained in a range R, then the zero-extended or one-extended longest matching prefix for range R must be the longest prefix in its corresponding class for query point X.

In one embodiment, the zero-extended longest matching prefixes for each of the disjoint ranges to be matched are stored in a TCAM class zero, and the one-extended longest matching prefixes are stored in a TCAM class one. To search for a query point X, a longest prefix matching operation is performed in both TCAM classes on X, and then X is checked to see if it falls within one of the ranges corresponding to TCAM results.

Figure 2A:
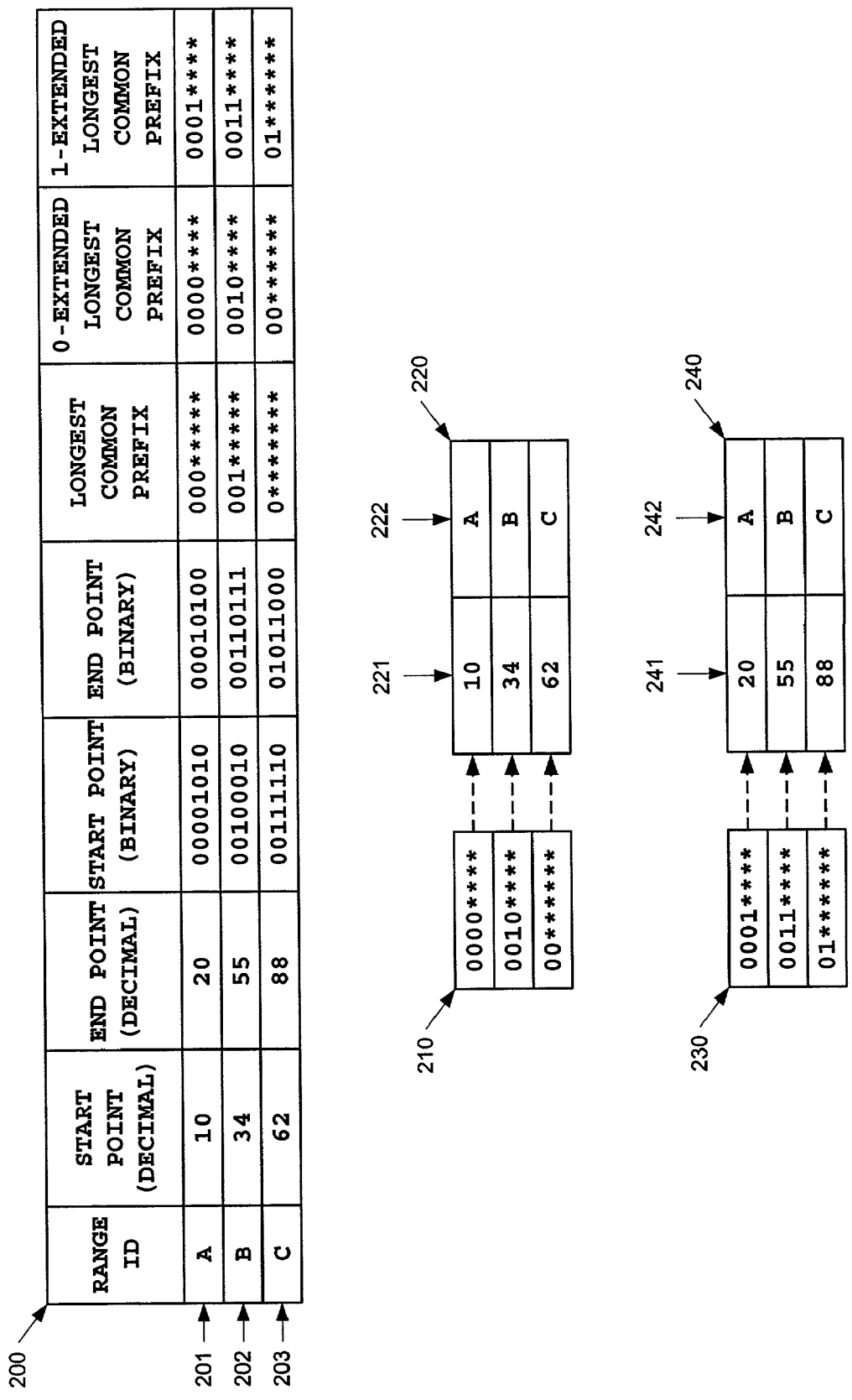
FIGS. 2A-B illustrate how one embodiment operates on an example set of ranges.
Figure 2B:
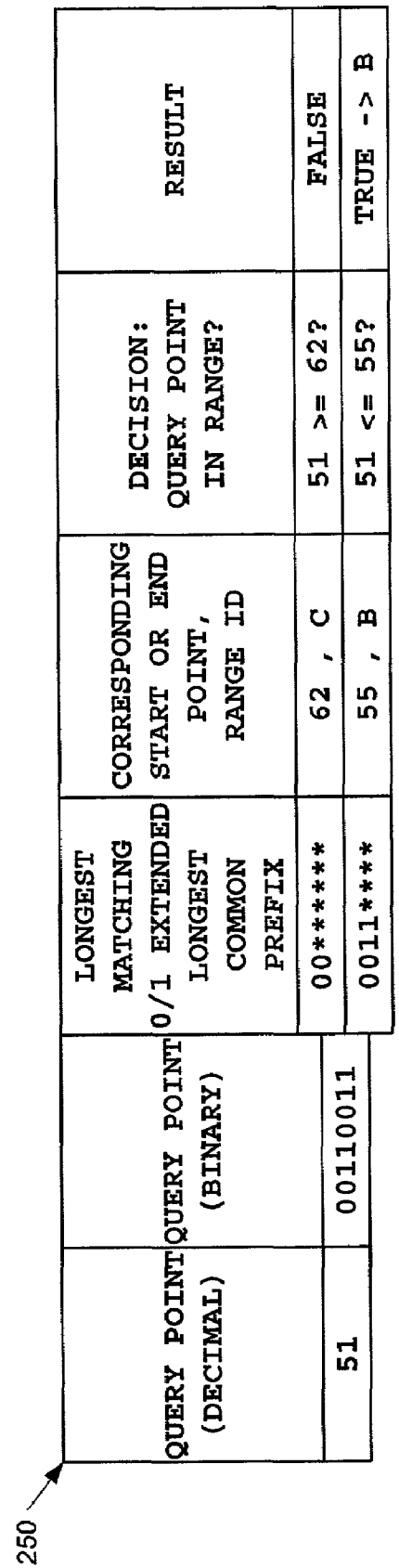

FIGS. 2A-B illustrate the manner in which one embodiment operates on an example set of ranges. Turning to FIG. 2A, table 200 illustrates the example set of three ranges 201-203, with these ranges being 10-20, 34-55, and 62-88. Table 200 includes entries showing the longest common prefix of the start and end points for each range, and the zero and one extensions of these longest common prefixes. TCAM 210 and adjunct memory 220 correspond to the starting points of the ranges, while TCAM 230 and adjunct memory 240 correspond to the ending points of the ranges. The zero-extended longest common prefixes are used to populate TCAM 210 with corresponding entries in adjunct memory 220 including the value of each starting point 221 and a range identifier 222 (used to readily identify the range corresponding to the starting point.) Similarly, the one-extended longest common prefixes are used to populate TCAM 230 with corresponding entries in adjunct memory 240 including the value of each ending point 241 and range identifier 242. For a given query point, a lookup operation is performed on TCAMs 210 and 230, with the result processed to whether or not there is a matching range, and if so, the identity of the range. Turning to FIG. 2B, table 250 illustrates the corresponding processing performed in one embodiment for an example query point 51. The binary representation of query point 51 is used as a lookup word in TCAMS 210 and 230 (FIG. 2A), to produce the longest matching zero-extended and one-extended longest common prefixes, with the corresponding start and end points of the range compared to the value of the query point. If the value of the query point is greater than or equal to the resultant start point, then the corresponding range matches; and if the value of the query point is less than or equal to the resultant end point, then that corresponding range matches. In the example of FIG. 2B, query point 51 is less than or equal to end point 55 (which corresponds to the longest matching one-extended longest common prefix), and thus, query point 51 lies within range B with start; point 34 and end point 55.

Figure 3A:
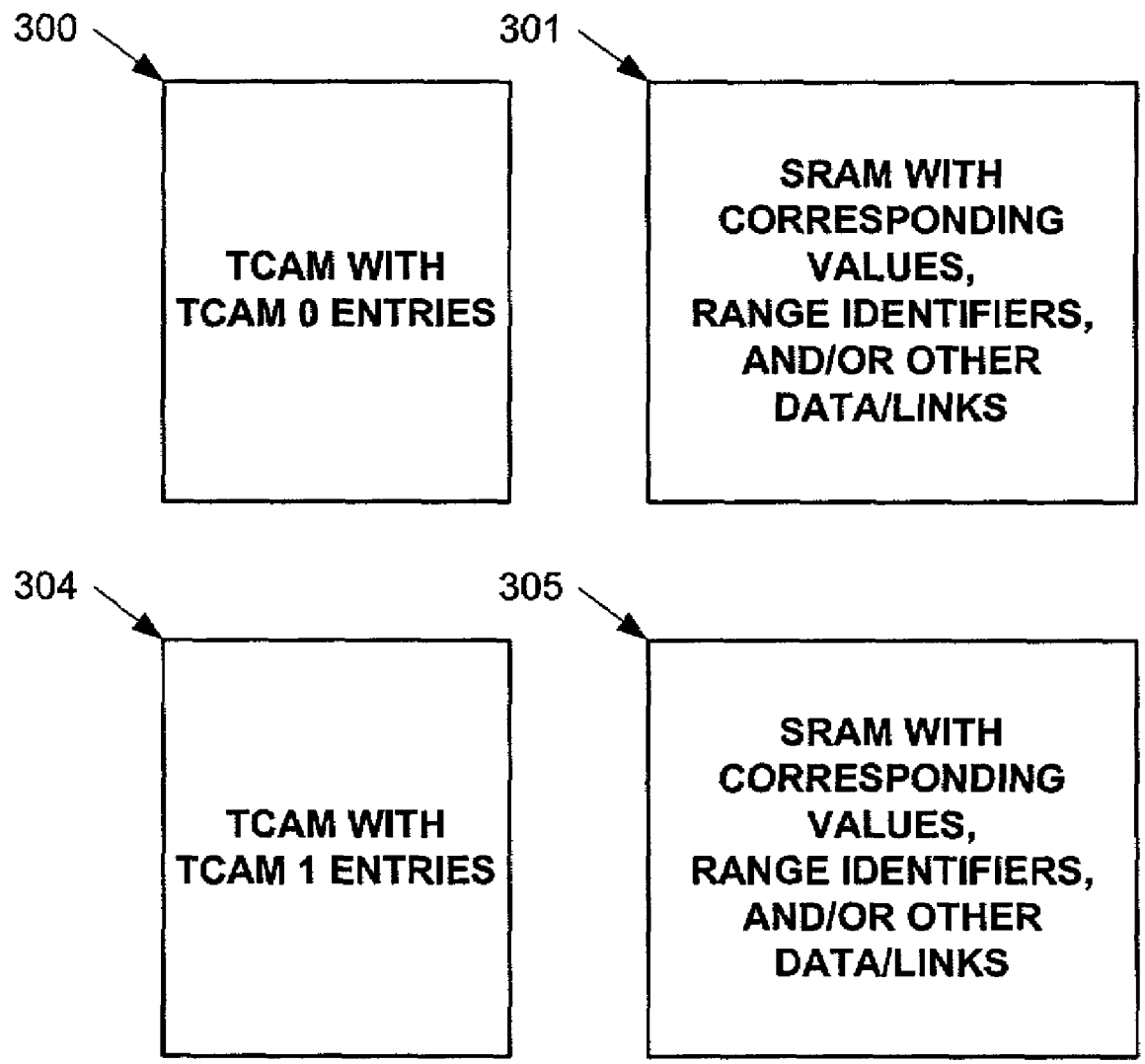
FIGS. 3A-B illustrate associative memory entries used in some embodiments.
Figure 3B:
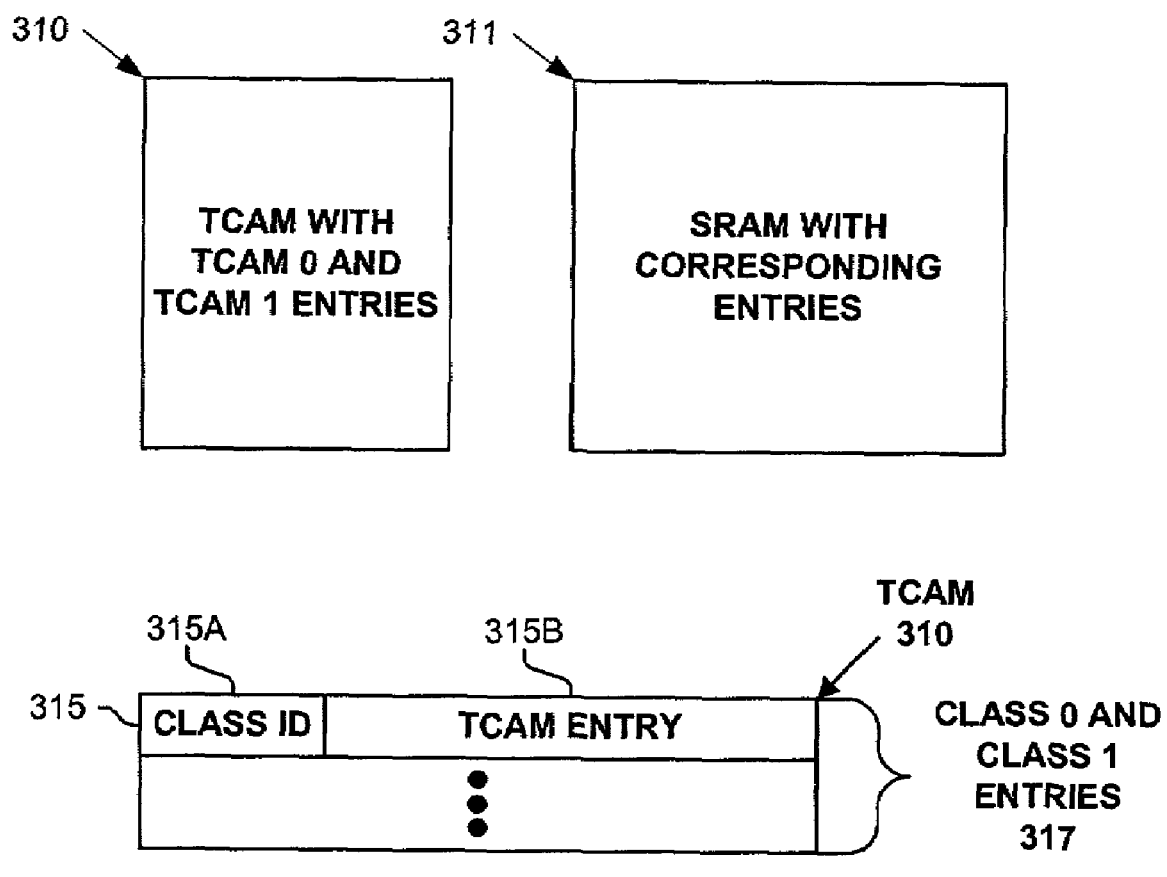
Figure 3C:
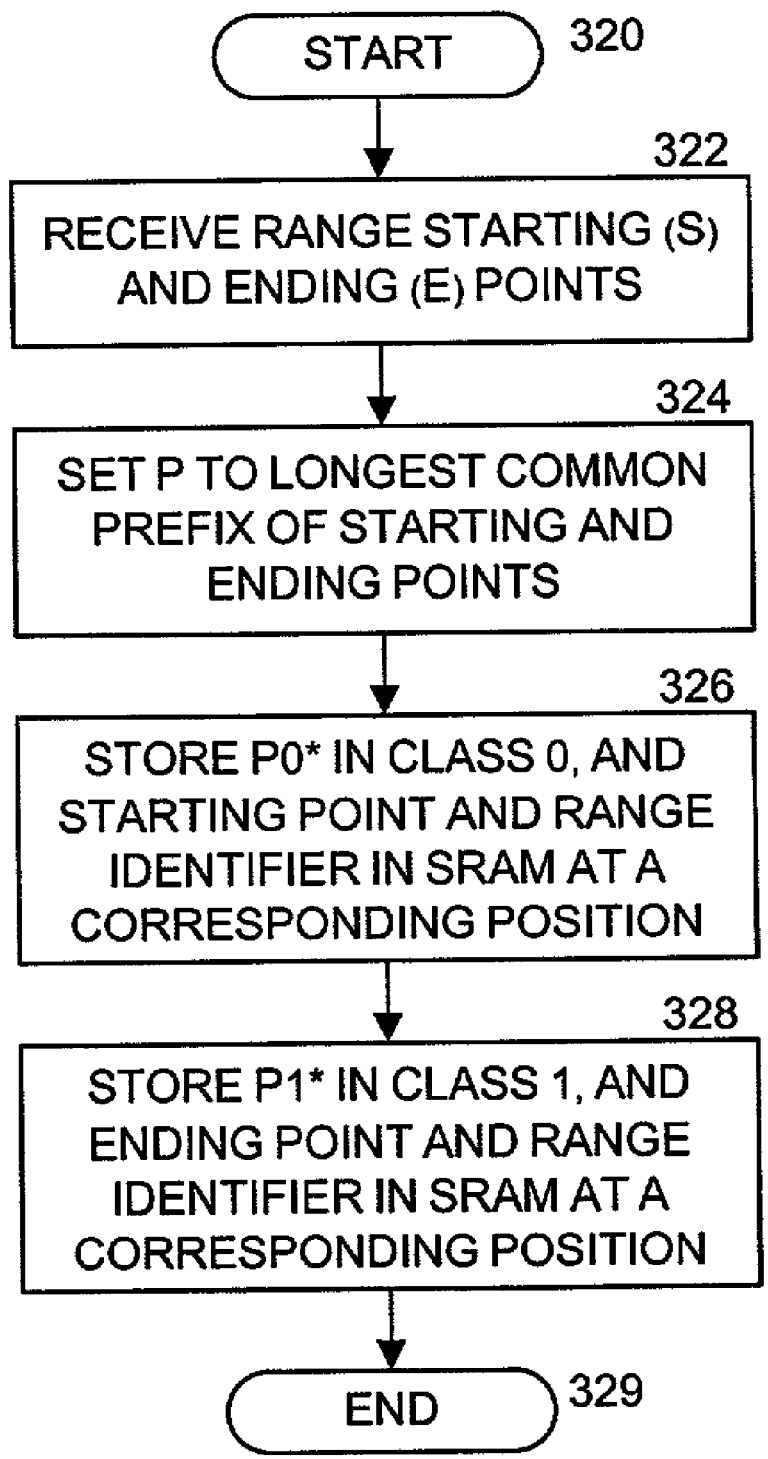
FIGS. 3C-E illustrate processes used in one embodiment for identifying a matching range based on a query point.
Figure 3D:
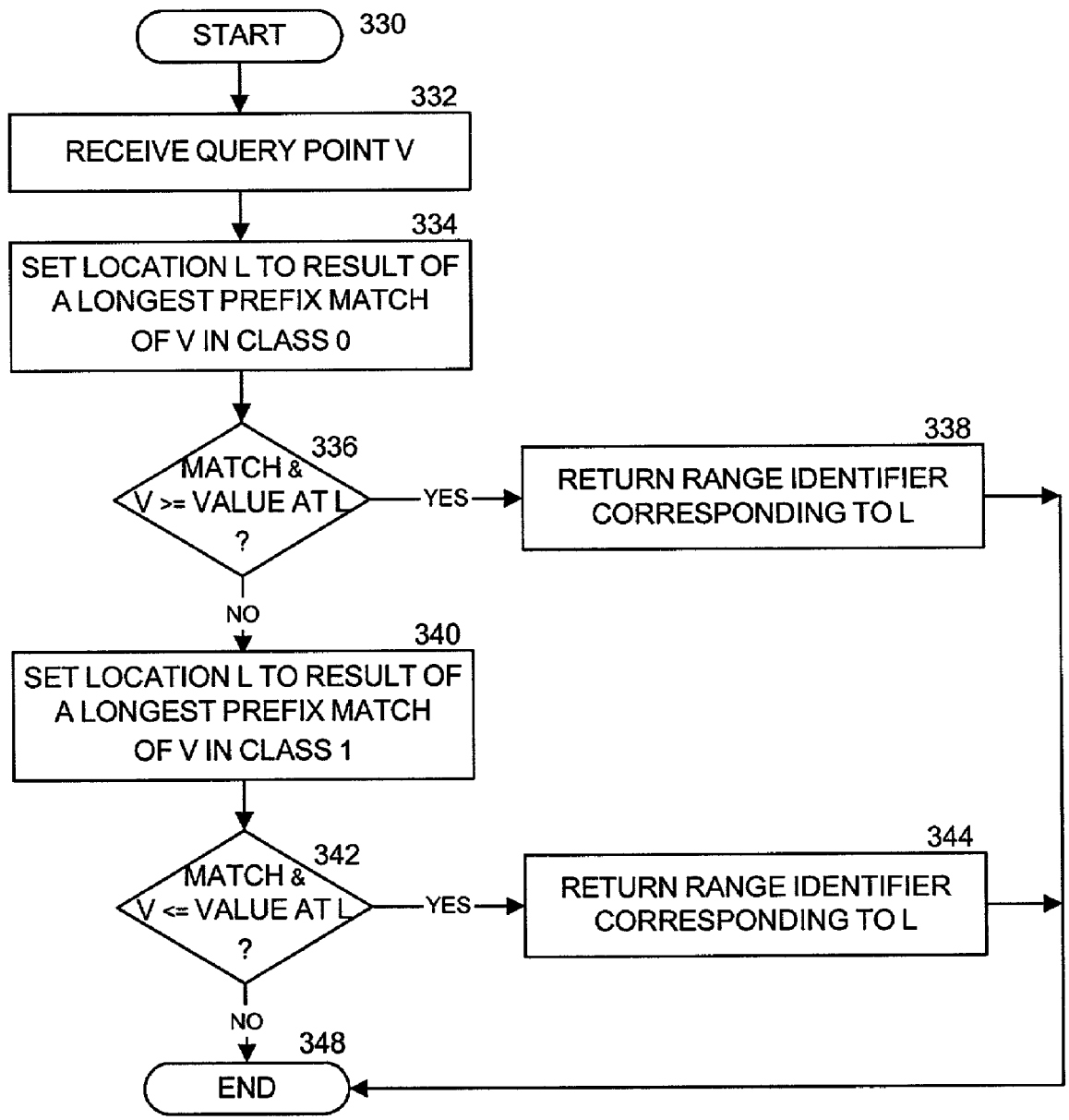
Figure 3E:
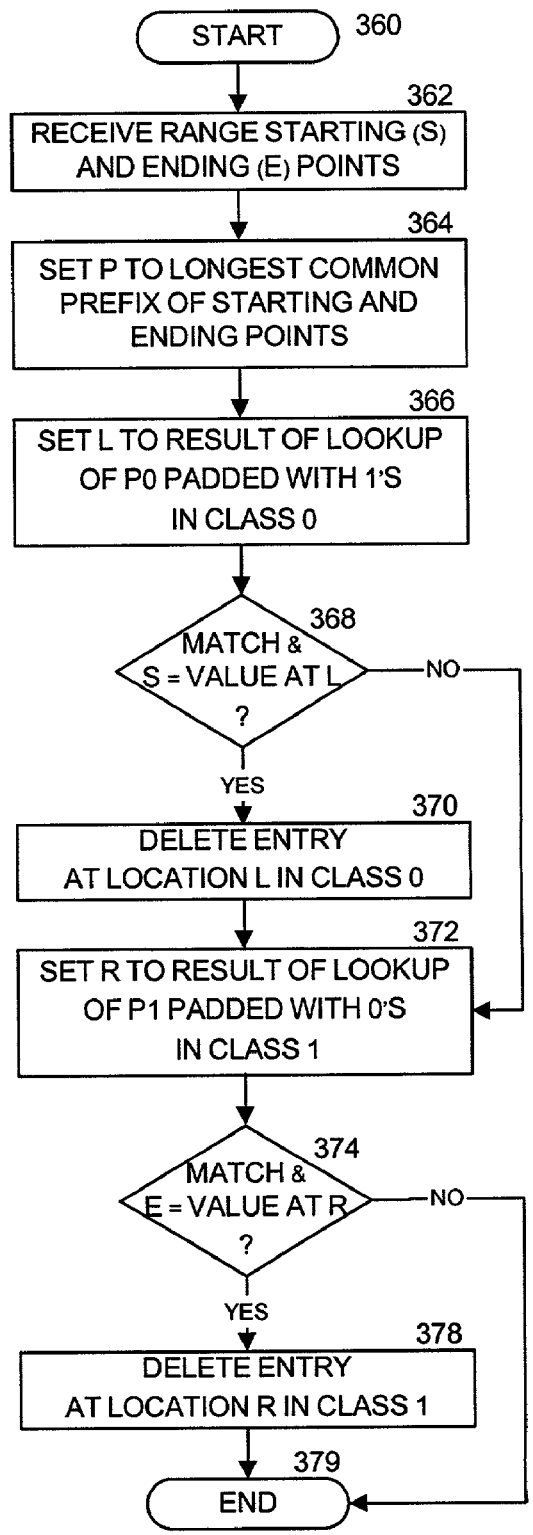

FIGS. 3A-B illustrate associative and adjunct memories and entries thereof, and FIGS. 3C-E illustrate processes used in one embodiment for determining a matching range based on a query point for disjoint ranges. In one embodiment, only two prefix entries per range are maintained in an associative memory; and insert, delete, and search operations may each be performed in two associative memory operations without maintaining a separate tree data structure in another memory.

Turning to FIG. 3A, illustrated is a configuration of associative memory entries used in one embodiment. TCAM 300 includes class zero associative memory entries and TCAM 304 includes class one associative memory entries. Adjunct SRAM memories 301 and 305 typically are used to store corresponding lookup results, such as, but not limited to values (e.g., starting and ending endpoint range values), range identifiers (e.g., a value or values to identify the range to which an endpoint or other entry belongs), and/or other data or links.

FIG. 3B illustrates a TCAM 310 used in one embodiment to store both class zero and class one associative memory entries 317, with each the respective class of each of these entries being identified by a class identification portion 315A with its TCAM entry portion 315B of each stored entry 315. As before, adjunct SRAM memory 311 is typically used to store corresponding lookup results, such as, but not limited to values (e.g., starting and ending endpoint range values), range identifiers (e.g., a value or values to identify the range to which an endpoint or other entry belongs), and/or other data or links.

FIGS. 3C-E illustrate processes used in one embodiment for maintaining ranges and for determining a matching range corresponding to a query point. Turning to FIG. 3C, illustrated is a process used in one embodiment for inserting a range having endpoints S and T. Processing begins with process block 320, and proceeds to process block 322, wherein starting point S and ending point E are received. Next, in process block 324, P is set to the longest common prefix of S and E. In process block 326, the zero-extended prefix of P is created by appending a zero to P, and it is stored in a set of zero-extended prefixes, such as, but not limited to being stored in an associative memory in a particular class (e.g., class zero). In process block 328, the one-extended prefix of P is created by appending a one to P, and it is stored in a set of one-extended prefixes, such as, but not limited to being stored in an associative memory in a particular class (e.g., class one). Processing is complete as indicated by process block 329.

FIG. 3D illustrates a process used in one embodiment to determine a matching range, if one exists, for a query point V. Note, in one embodiment, steps 334-338 and 340-344 are performed in parallel (in which case, these operations can be performed in one memory cycle using a two-stage pipeline); while in one embodiment they are performed serially, with either sets of steps being performed first.

Processing of the flow diagram of FIG. 3D begins with process block 330, and proceeds to process block 332, wherein query point V is received. Next, in process block 334, location L is set to the result of a longest prefix match of V in class zero (e.g., via an associative memory lookup operation.) As determined in process block 336, if there is a match and the value of V is greater than or equal to the value at L (e.g., the value of the starting endpoint of a range), then in process block 338, the range identifier (or other return value) is returned to identify the matching range, and processing is complete as indicated by process block 348. Otherwise, in process block 340, location L is set to the result of a longest prefix match of V in class one (e.g., via an associative memory lookup operation.) As determined in process block 342, if there is a match and the value of V is less than or equal to the value at L (e.g., the value of the ending endpoint of a range), then in process block 344, the range identifier (or other return value) is returned to identify the matching range. Processing is complete as indicated by process block 348.

FIG. 3E illustrates a process used in one embodiment to delete a range having endpoints S and E. Processing begins with process block 360, and proceeds to process block 362, wherein starting point S and ending point E are received. Next, in process block 364, P is set to the longest common prefix of S and E. In process block 366, the zero-extended prefix of P is created by appending a zero to P, and a lookup operation is performed using the zero-extended prefix padded with ones in class zero. As determined in process block 368, if a match is found and the value at the matching location equals S (the starting point of the range being deleted), then in process block 370, the corresponding entry at the matching location is deleted. Next, in process block 372, the one-extended prefix of P is created by appending a one to P, and a lookup operation is performed using the one-extended prefix padded with zeros in class one. As determined in process block 374, if a match is found and the value at the matching location equals E (the ending point of the range being deleted), then in process block 378, the corresponding entry at the matching location is deleted. Processing is complete as indicated by process block 379.

Range Intersection for Disjoint Ranges

Similar processing can be used to determine if a query range intersects one of a set of disjoint and/or non-disjoint ranges as the matching problem can be reduced to two point intersection problems. For a query range of [X,Y], a point search operation (e.g., that described in relation to FIG. 3D) on Y can be performed on the set of ranges, and if a match is found, then the matching range is identified. Otherwise, a second set of ranges is searched based on Y, with this second set of ranges being the ranges from zero to the first endpoint, the first endpoint to the second endpoint, and so on. If a match of range [E1,E2] is found, and X is found to be less than the value of the E1, then the matching range has ending point E1 and its corresponding starting point. Otherwise, there is no intersection.

For disjoint ranges, these two lookup operations can be combined into a single lookup operation on a set of ranges consisting of zero to the first starting point, the first starting point to the first ending point, the first ending point to the second starting point, and so on. A set of processes used in one embodiment for performing such operations is presented in FIGS. 4A-F. For each endpoint (e.g., start and end points) of a range, an indication of whether the endpoint is a start point or end point and an indication of the corresponding range are maintained. One note, during a range insert operation, the corresponding range of a current range endpoint to the next range starting endpoint does not need to be deleted, because if X<=Y<=Z, then the longest common prefix of X and Z is a subprefix of both the longest common prefix of x and y and the longest common prefix of y and z, and it equals one of these two longest common prefixes, where a subprefix refers to prefix shorter in length than a second prefix which has the most significant bits as the second prefix.

Figure 4A:
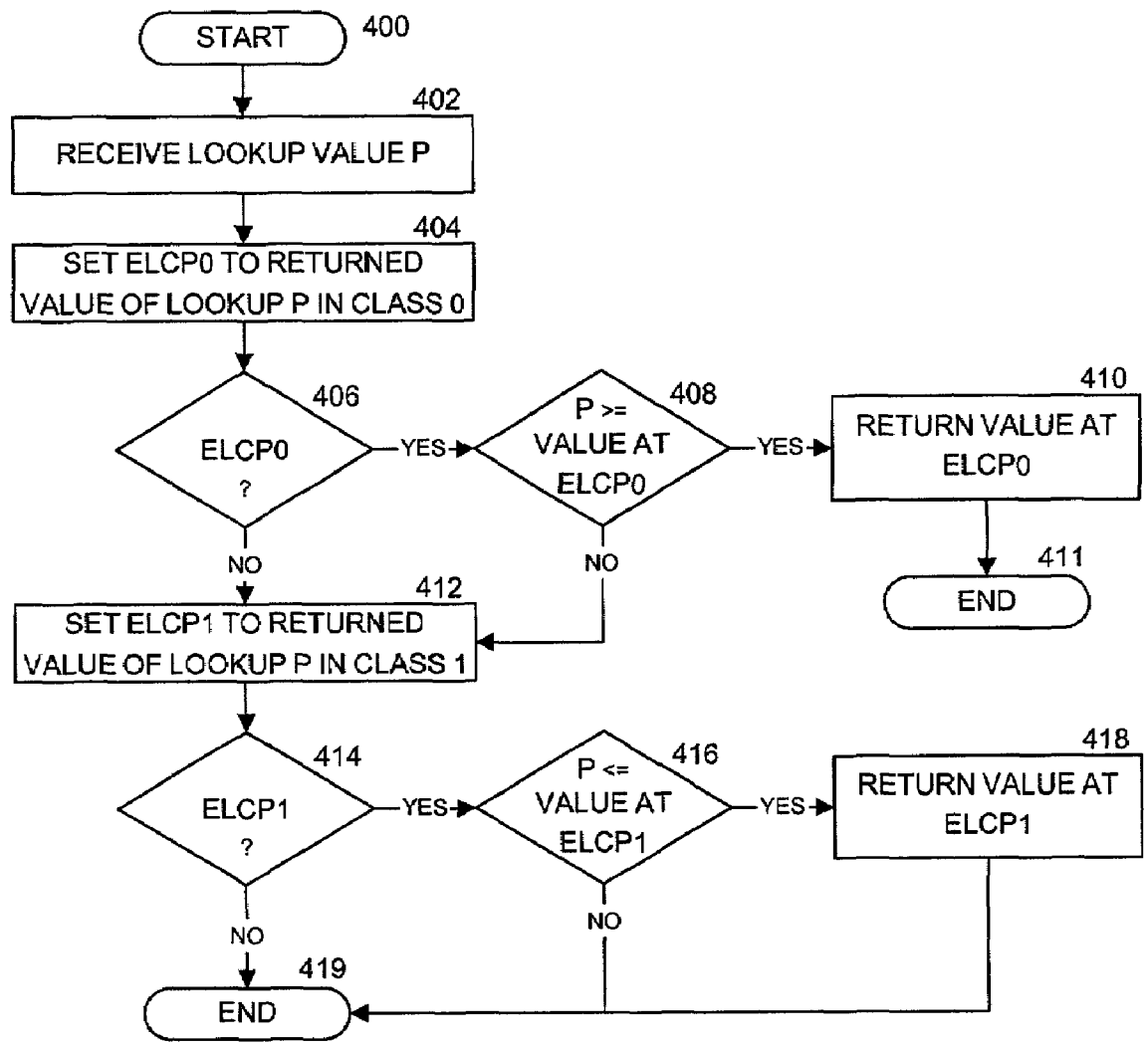
FIGS. 4A-F illustrate flow diagrams of processes used in one embodiment for identifying a matching range based on a query range.

FIG. 4A illustrates a process used in one embodiment to perform a lookup operation on a point P in a set of ranges represented by sets of extended longest common prefixes. Processing begins with process block 400, and proceeds to process block 402, wherein lookup value P is received. Next, in process block 404, a lookup operation is performed in class zero of the extended longest common prefixes based on query point P. As determined in process block 406, if a match is found, then as determined in process block 408, if the value of P is greater than or equal to the value corresponding to the matching location, then the value is returned in process block 410, and processing is complete as indicated by process block 411. Otherwise, in process block 412, a lookup operation is performed in class one of the extended longest common prefixes based on query point P. As determined in process block 414, if a match is found, then as determined in process block 416, if the value of P is less than or equal to the value corresponding to the matching location, then the value is returned in process block 418. Processing is complete as indicated by process block 419.

Figure 4B:
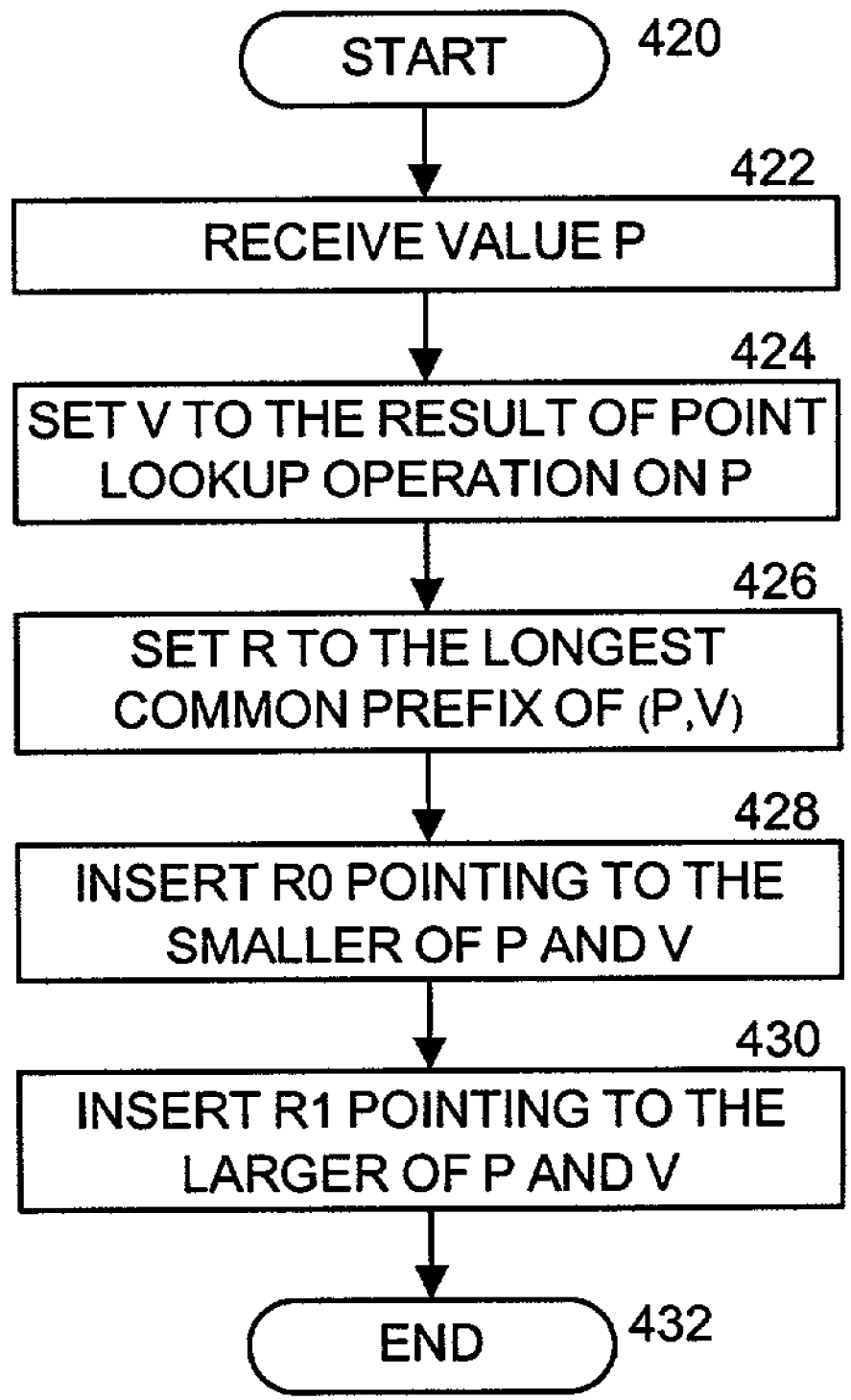

FIG. 4B illustrates a process used in one embodiment to insert a point. Processing begins with process block 420, and proceeds to process block 422, wherein the value of P is received. In process block 424, V is set to the result of the point lookup operation (e.g., the process illustrated in FIG. 4A) on P. In process block 426, R is set to the longest common prefix of P and V. In process block 428, prefix R is extended by appending a zero to create its zero-extended prefix, and it is added to the set of zero-extended prefixes with a corresponding indicator of the smaller of P and V stored in a corresponding location in an adjunct memory. In process block 430, prefix R is extended by appending a one to create its one-extended prefix, and it is added to the set of one-extended prefixes with a corresponding indicator of the larger of P and V stored in a corresponding location in an adjunct memory. Processing is complete as indicated by process block 432.

Figure 4C:
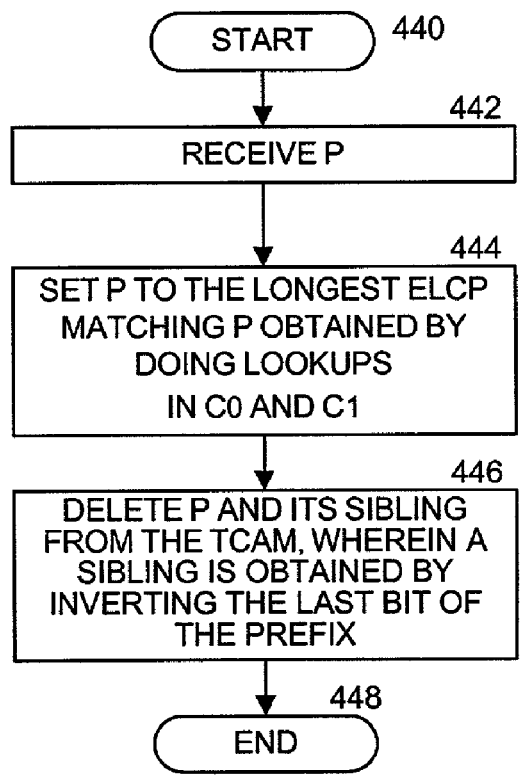

FIG. 4C illustrates a process used in one embodiment to delete a point. Processing begins with process block 440, and proceeds to process block 442, wherein the value of P is received. In process block 444, P is set to the longest common extended prefix matching P obtained by lookup operations in the sets of zero-extended and one-extended prefixes. Next, in process block 446, P and its sibling are deleted from the associative memory, and optionally, an adjunct memory is updated, wherein a sibling is obtained by inverting the last bit of the prefix. Processing is complete as indicated by process block 448.

Figure 4D:
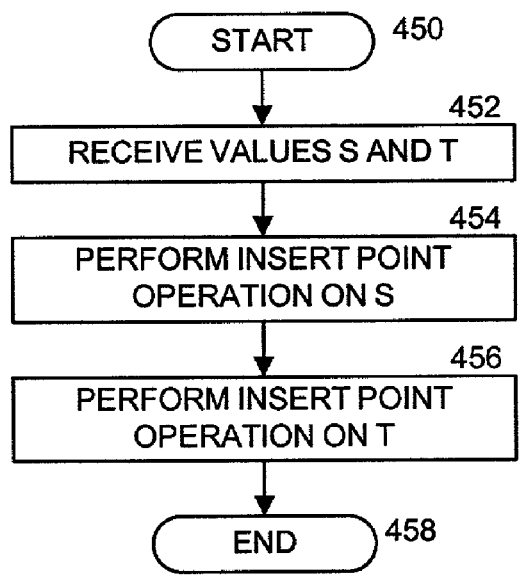

FIG. 4D illustrates a process used in one embodiment to insert a range. Processing begins with process block 450, and proceeds to process block 452, wherein the starting and ending points of the range to be added are received. Next, in process block 454, an insert point operation, such as that illustrated in FIG. 4B, is performed based on the received starting point. Next, in process block 456, an insert point operation, such as that illustrated in FIG. 4B, is performed based on the received ending point. Processing is complete as indicated by process block 458.

Figure 4E:
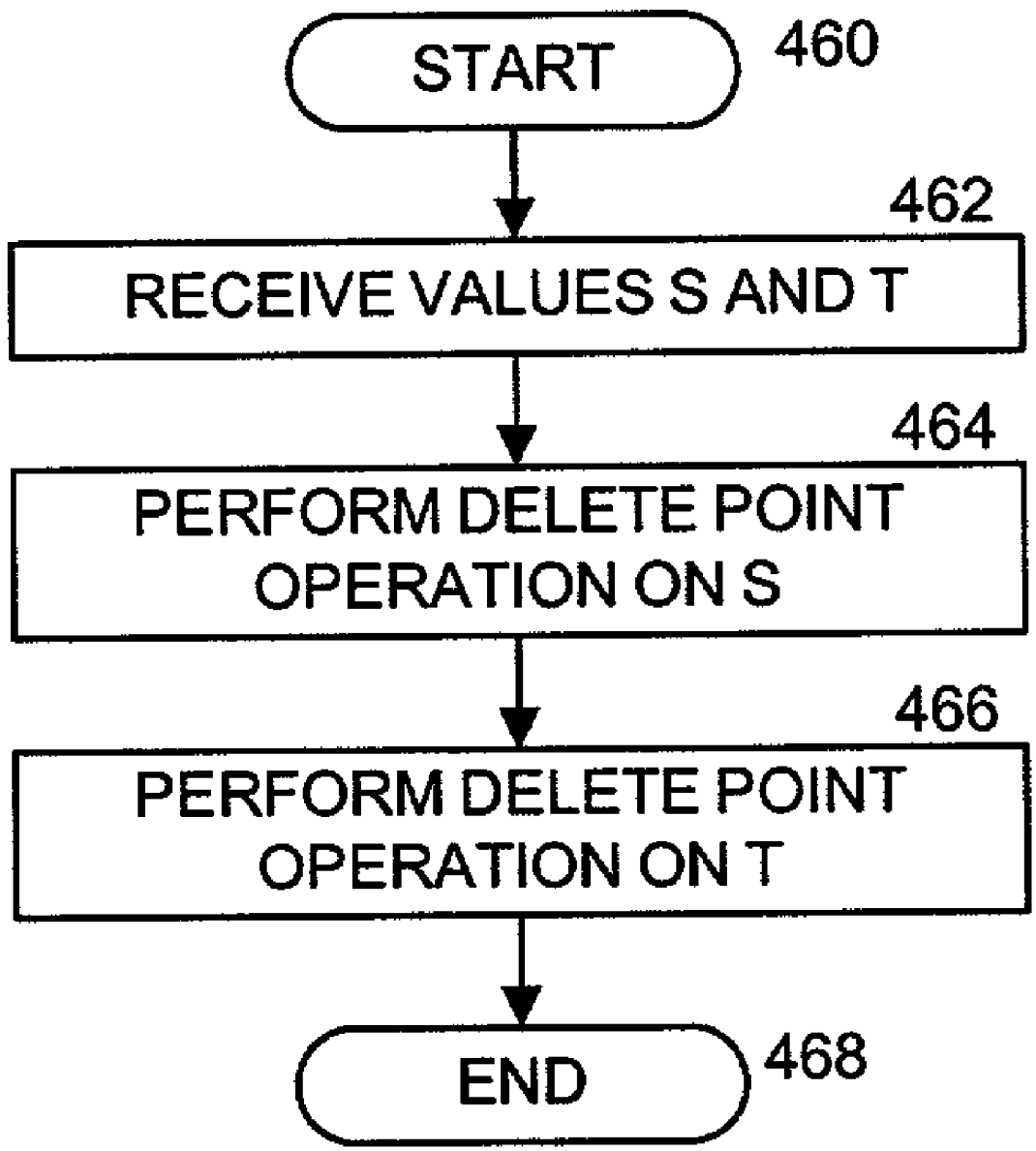

FIG. 4E illustrates a process used in one embodiment to delete a range. Processing begins with process block 460, and proceeds to process block 462, wherein the starting and ending points of the range to be deleted are received. Next, in process block 464, a delete point operation, such as that illustrated in FIG. 4C, is performed based on the received starting point. Next, in process block 466, a delete point operation, such as that illustrated in FIG. 4C, is performed based on the received ending point. Processing is complete as indicated by process block 468.

Figure 4F:
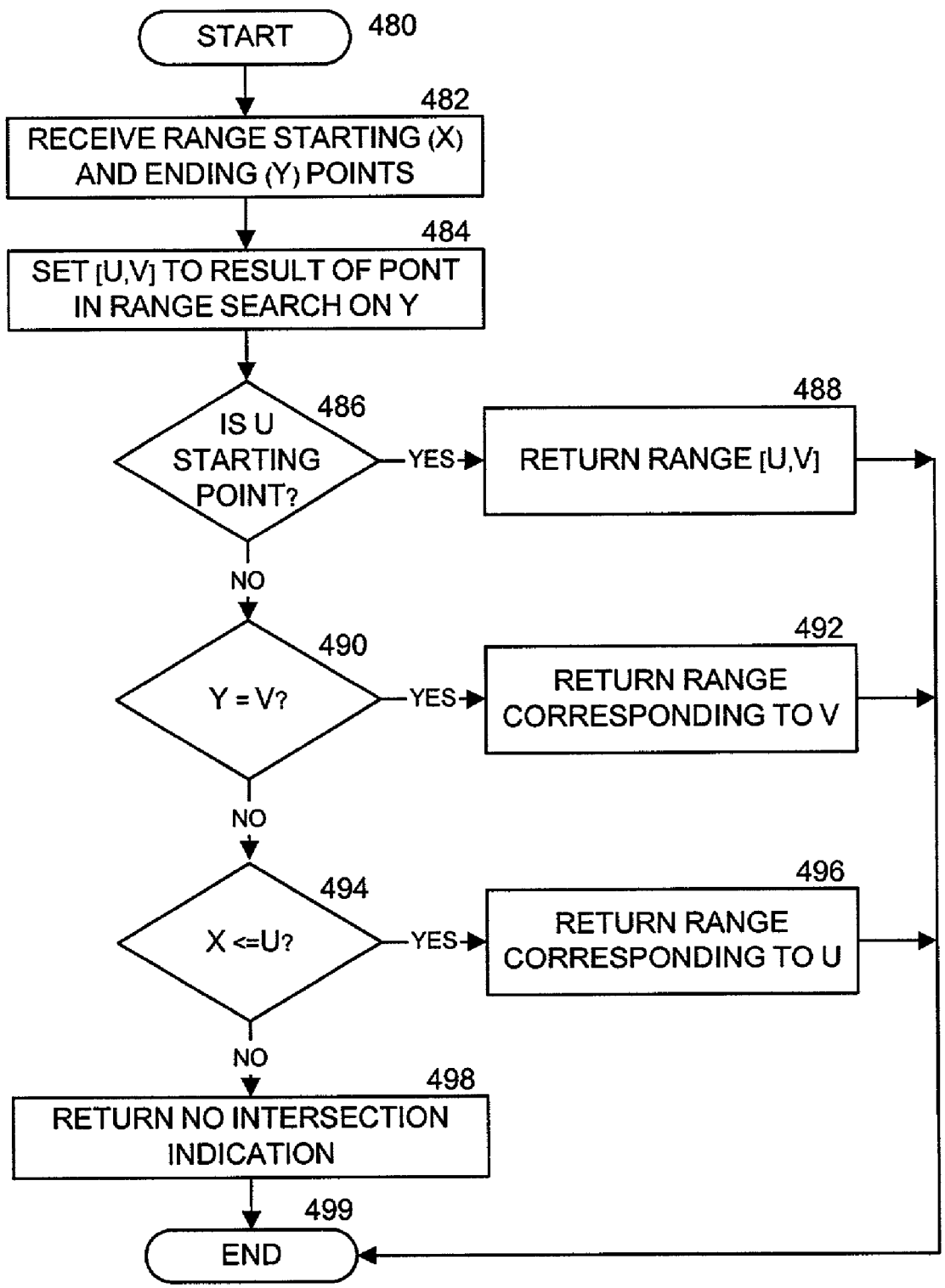

FIG. 4F illustrates a process used in one embodiment to perform a search operation on a received range against a set of ranges. Processing begins with process block 480, and proceeds to process block 482, wherein the starting and ending points of the query range are received. Next, in process block 484, a range search operation is performed on the ending point of the received query range with the result being range [U,V]. As determined in process block 486, if U is a starting point, then the matching range of [U,V] is returned in process block 488. Otherwise, as determined in process block 490, if the received ending point of the query range is equal to V, then the range corresponding to V is returned in process block 492. Otherwise, as determined in process block 494, if the received starting point of the query range is less than or equal to U, then the range corresponding to U is returned in process block 496. Otherwise, in process block 498, an indication of no intersecting range is returned. Processing is complete as indicated by process block 499.

Point Intersection for Possibly Non-Disjoint Ranges

One embodiment provides a mechanism for determining a matching range based on a query point wherein the ranges may overlap (e.g., the ranges may be disjoint.) One embodiment exploits the similarities between a Patricia tree and longest common prefixes in maintaining a set of ranges and determining which, if any, of the possibly overlapping ranges matches a received query point or range. In one embodiment, a sorted set of points, the set of longest common prefixes of adjacent points represents the Patricia tree of these points. These longest common prefixes are all of the internal nodes in the Patricia tree. A Patricia tree data structure, without explicitly maintaining it, may be used for identifying a matching range based on a query point or query range by storing longest common prefixes of consecutive points and performing longest prefix matches.

Figure 5A:
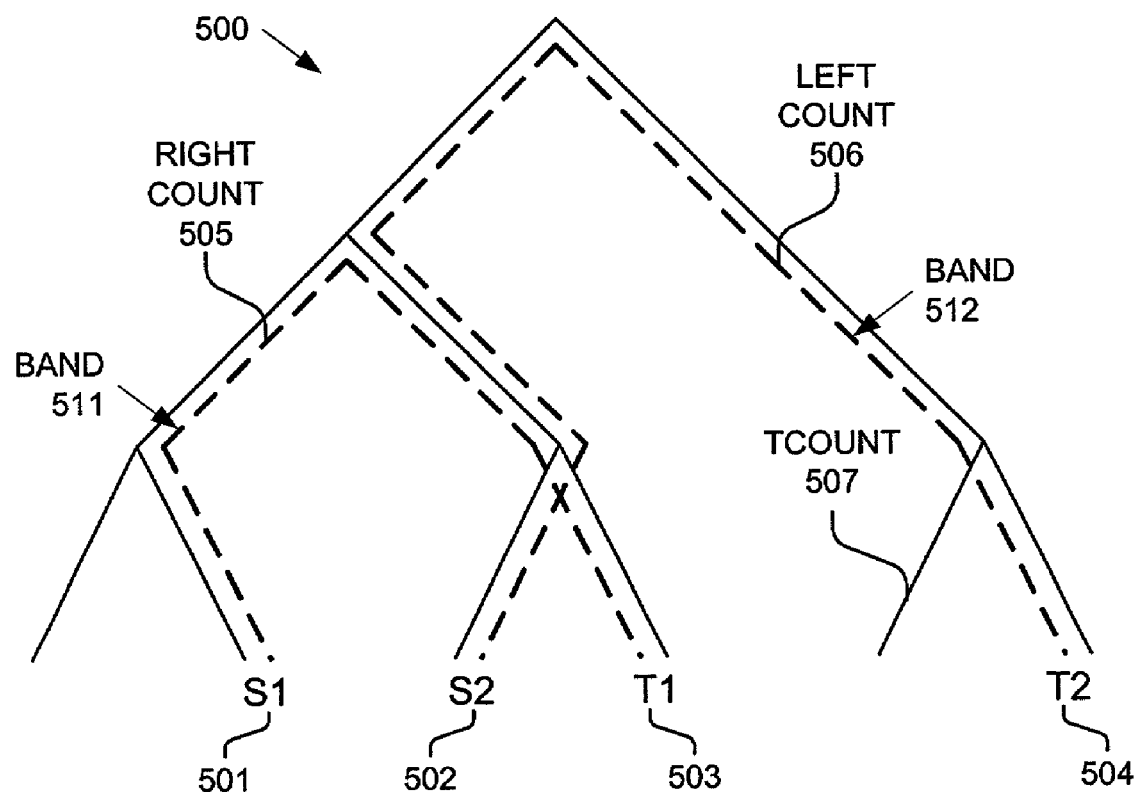
FIG. 5A is a block diagram illustrating bands, left and right counts, and Tcounts used in one embodiment for identifying a matching range based on a query point.

FIG. 5A illustrates an exemplary Patricia tree 500 formed by the endpoints of ranges S1 (501) to T1 (503) and S2 (502) to T2 (504). Each edge of the Patricia tree corresponds to an extended common prefix, with a zero-extended longest common prefix corresponding to a left edge, and a one-extended longest common prefix corresponding to a right edge. For every range, a band is formed from the starting point of the range to the longest common prefix of the starting and ending points of the range, back to the ending point of the range. For example, illustrated are first and second portions 511-512 of a band, wherein the first portion 511 corresponds to range S1 (501) to T1 (503), and second portion 512, corresponds to range S2 (502) and T2 (504). Each band passes through some edges of the tree. It could pass an edge either from the left side or from the right side. The portions of the band from a starting point to the longest common prefix is said to pass through their edges on the right side. And the remaining portion of the band passes through its edges on the left side. For each edge, a count of the number of bands passing through its left side (left count) and the number of bands passing through its right side (right count) are maintained. Another count, "Tcount" is maintained for each edge (u, v) where u is the parent of v. If v is the right child of u, then the Tcount reflects the number of bands passing through the right side of node u and not passing through (u, v). Similarly, If v is the left child of u, then the Tcount reflects number of bands through the left side of u and not passing through (u, v). Right count 505, left count 506, and Tcount 507 are illustrated in FIG. 5A. FIG. 5B illustrates routines 520 and 525 used in one embodiment to insert a range [S,T] into a set of ranges to be searched. As shown, insert(S,T) 525 is first called, and then it determines the longest common prefix of the endpoints and uses routine 520 to insert the left and right bands. Similarly, FIG. 5D illustrates routines 540 and 545 used in one embodiment to delete a range [S,T] from the set of ranges to be searched. As shown, delete(S,T) 545 is first called, and then it determines the longest common prefix of the endpoints, and uses routine 540 to delete the left and right bands.

FIG. 5C illustrates routines 530 and 535 used in one embodiment to perform a search operation on a set of ranges based on received query point X. In one embodiment, if query point X lies in a range [S,T], then the path from X to root of the Patricia tree must touch the band(S,T) somewhere on the path. Two cases to handle are derived by looking at a first node where it intersects the band. In the first case, the first point of intersection (e.g., the point where the path from X to root first touches the Patricia tree) is not an internal node of the Patricia tree. If X hits the band(S,T) on an edge E from the left side then the band(S,T) must have been counted in the left count of the edge. Similarly, if X hits the edge E from the right side. In the second case, the first point of intersection is an internal node of the Patricia tree. In this case, the path from X to the root hits the band(S,T) along an edge E then the band(S,T) must have been counted in the Tcount for the edge E.

One embodiment determines if the path from X to the root hits a band by finding the first edge E where the path from X to the root touches the tree. If the count for X's side (left/right) of E is non-zero, then it has touched a band. Otherwise, a check is made if any edge from E to the root has a non-zero Tcount. If so, there is an intersection; otherwise there is not an intersection. In one embodiment using extended prefixes, the longest extended prefix matching x is determined. If the count on X's side of extended longest common prefix is not non-zero, then a determination is made if any extended longest common prefix that is a prefix of X has a non-zero Tcount. This can be done in one associative memory lookup operation by maintaining all the extended longest common prefixes with non-zero Tcounts in a separate associative memory or in a separate class of a common associative memory. The counts are only updated during insert and delete operations. Further, in one embodiment, in order to locate the prefixes during deletes, this class is divided into two classes, one for prefixes ending in zero and the other for prefixes ending in one. Alternately, these prefixes can be referenced via their original copies in class zero or one. Furthermore, a parent node of a prefix P can be determined using two associative memory lookups and by taking the longer of the two results. These lookups being: let Q be the prefix obtained by dropping the last bit of P, and then perform lookups using Q01 . . . 1 and Q10 . . . 0 in class C0 and C1, respectively.

Maintaining Sorted Elements and their Use in Priority Queue Operations

Figure 6:
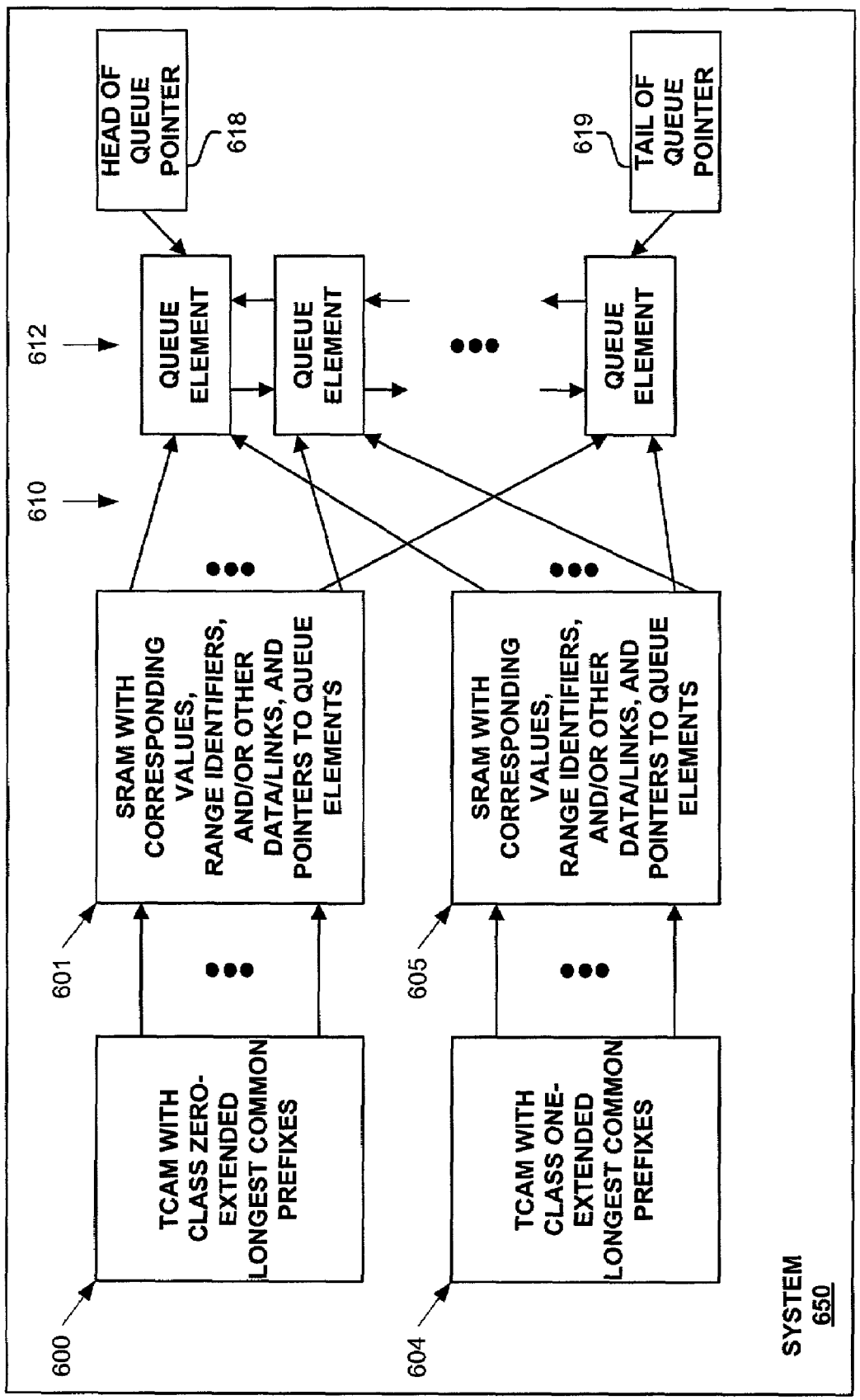
FIG. 6 is a block diagram of a system used in one embodiment that maintains sorted lists using range operations and provides priority queue operations.

FIG. 6 illustrates a block diagram of a system 650 for maintaining elements in a sorted order, and for performing priority queue operations. In one embodiment, system 650 resides in a single chip or ASIC. In one embodiment, less than all of the illustrated components of system 650 reside on the same chip or ASIC.

A range search of a set of ranges can be used to maintain entries in a sorted list. The ranges in the set of ranges includes zero to the lowest number, the lowest number to the next number, and so on. By maintaining a doubly linked list, such as in an adjunct memory for each range entry in an associative memory, insertion of numbers can easily be performed. In this manner, insets and deletes can be performed in O(1) time. Thus, sorting n numbers can be performed in O(n) time. In one embodiment, this technique is used to maintain priority queues, upon which the operations such as finding and/or extracting the minimum or maximum queued entry can be performed.

In one embodiment, system 650 includes associative memories 600 and 604, one for each class of extended longest common prefix associative memory entries. In one embodiment, these two classes of associative memory entries reside in the same associative memory and are distinguished by different class identifying fields. In one embodiment, the zero extended longest common prefixes of these ranges used to identify each of the queue elements 612 is maintained in associative memory 600, with the one-extended longest common prefixes of these ranges maintained in associative memory 604.

Adjunct memories 601 and 605, respectively corresponding to associative memories 600 and 604, typically store values of entries in the sorted list and pointers to 610 to queue elements 612, although in one embodiment, these values are stored in queue elements 612, which are maintained in a sorted order with a doubly linked list for immediate access to the next and previous queue elements 612. A head of queue pointer 618 and tail of queue pointer 619 are also maintained in one embodiment for instant access to the head and tail elements of queue elements 612.

Figure 7A:
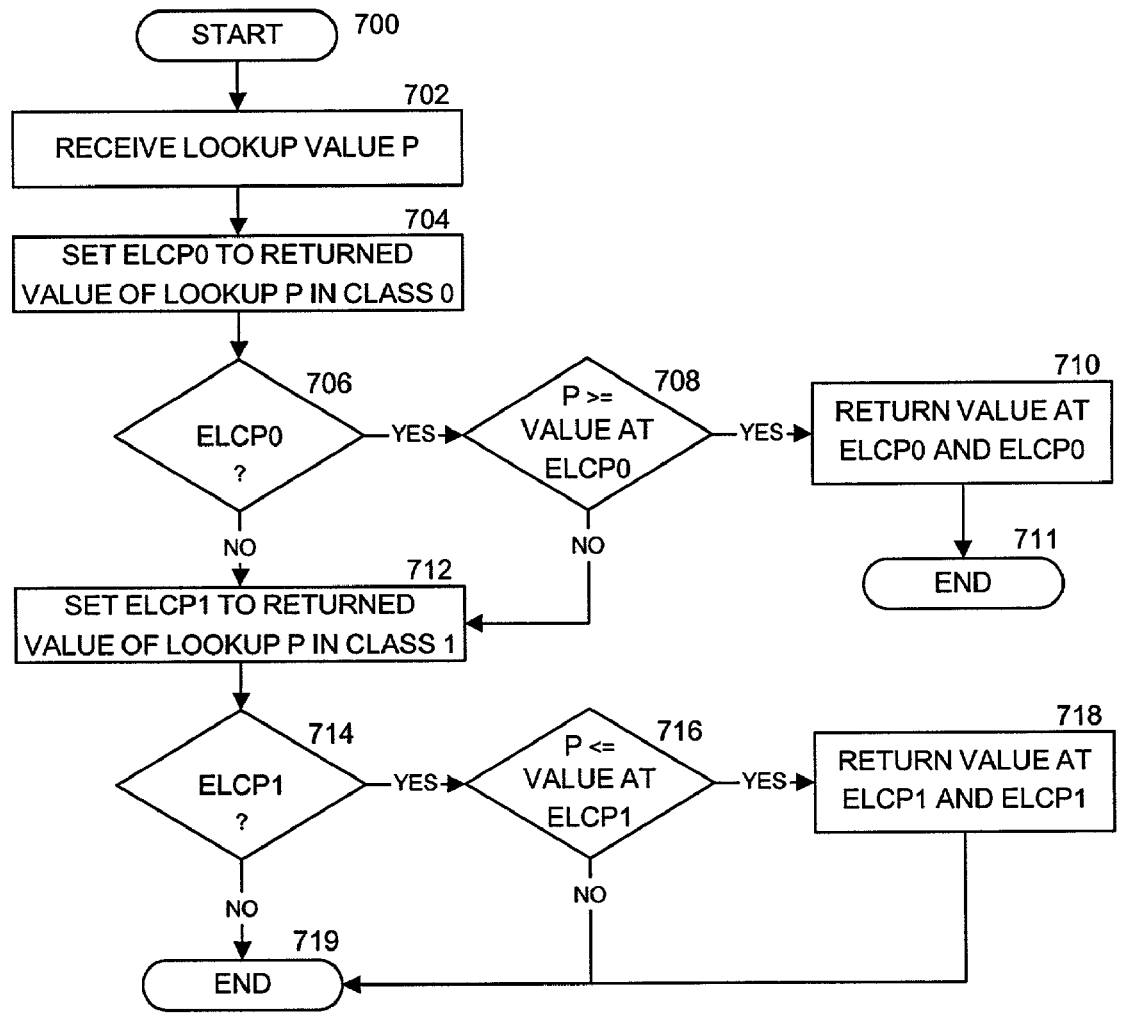
FIGS. 7A-7D illustrate flow diagrams of processes used in one embodiment to maintain sorted lists using range operations and to provide priority queue operations.

FIGS. 7A-7D illustrate processes used in one embodiment for maintaining elements in a sorted order, and for performing priority queue operations. As described herein, the values of FIG. 7A illustrates a process used in one embodiment to lookup an element in a sorted list. Processing begins with process block 700, and proceeds to process block 702, wherein the value of the element to be identified is received. In process block 704, the variable ELCP0 is set to the returned value of the associative memory/adjunct memory lookup operation based on the value of P in the set of zero-extended longest common prefixes. As determined in process block 706, if there was a hit during this lookup operation, then as determined in process block 708, if the value of P is greater than or equal than the value at ECLP0, then the matching queue element has been located and in process block 710, the value (e.g., pointer to a queue element) at location ECLP0 and ELCP0 itself are returned, and processing is complete as indicated by process block 711.

Otherwise, in process block 712, the variable ELCP1 is set to the returned value of the associative memory/adjunct memory lookup operation based on the value of P in the set of one-extended longest common prefixes. As determined in process block 714, if there was a hit during this lookup operation, then as determined in process block 716, if the value of P is less than or equal than the value at ECLP1, then the matching queue element has been located and in process block 718, the value (e.g., pointer to a queue element) at location ECLP1 and ELCP1 itself are returned. Processing is complete as indicated by process block 719.

Figure 7B:
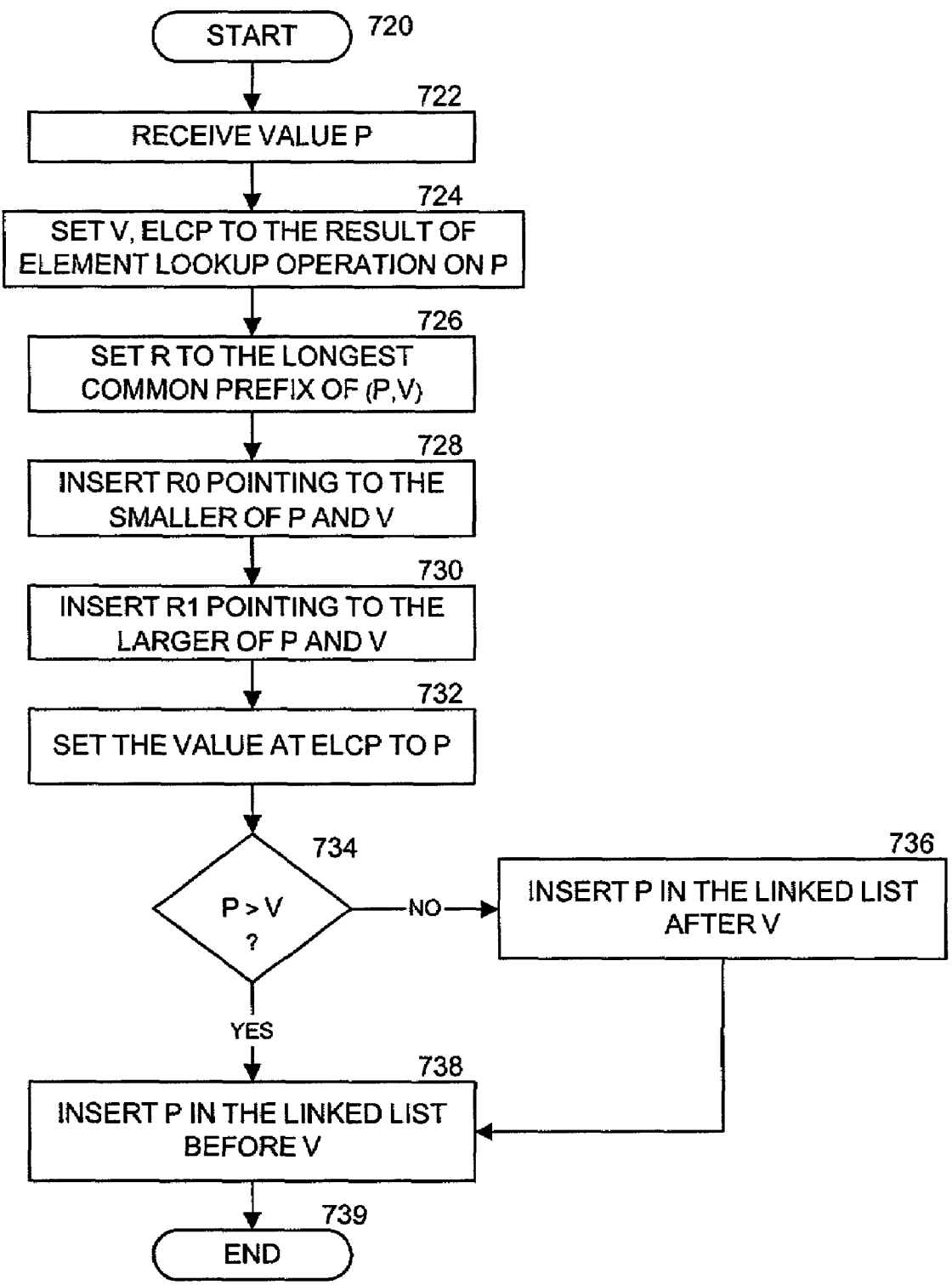

FIG. 7B illustrates a process used in one embodiment for inserting an object into a sorted list. Processing begins with process block 720, and proceeds to process block 722, wherein the value of P is received. Next, in process block 724, the variables V and ELCP are set to the result of the element lookup operation (e.g., FIG. 7A) on P. Next, in process block 726, the variable R is set to the longest common prefix of P and V. In process block 728, the zero-extended prefix of R is inserted into the list with its value pointing to the smaller of P and V. In process block 730, the one-extended prefix of R is inserted into the list with its value pointing to the larger of P and V. Next, in process block 732, the value at ELCP is set to P. As determined in process block 734, if P is greater than V, then P is inserted in the linked list before V in process block 738; otherwise, P is inserted in the linked list after V in process block 736. Processing is complete as indicated by process block 739.

Figure 7C:
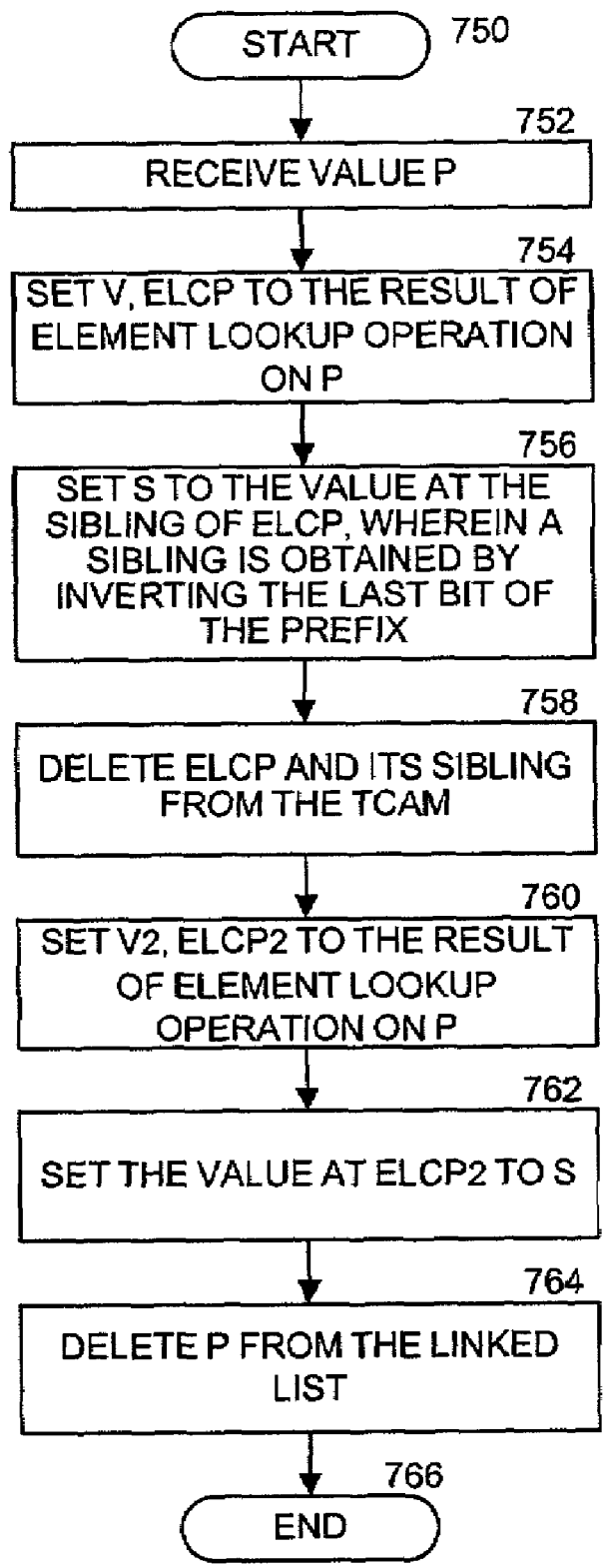

FIG. 7C illustrates a process used in one embodiment for deleting an element. Processing begins with process block 750, and proceeds to process block 752, wherein the value of P is received. Next, in process block 754, the variables V and ELCP are set to the result of the element lookup operation (e.g., FIG. 7A) on P. Next, in process block 756, the variable S is set to the value at the sibling of ELCP, wherein a sibling is obtained by inverting the last bit of the prefix. In process block 758, ELCP and its sibling are deleted from the TCAM. Next, in process block 760, the variables V2 and ELCP2 are set to the result of the element lookup operation (e.g., FIG. 7A) on P. Next, in process block 762, the value at ELCP2 is set to S. In process block 764, the element P is deleted from the linked list. Processing is complete as indicated by process block 766.

Figure 7D:
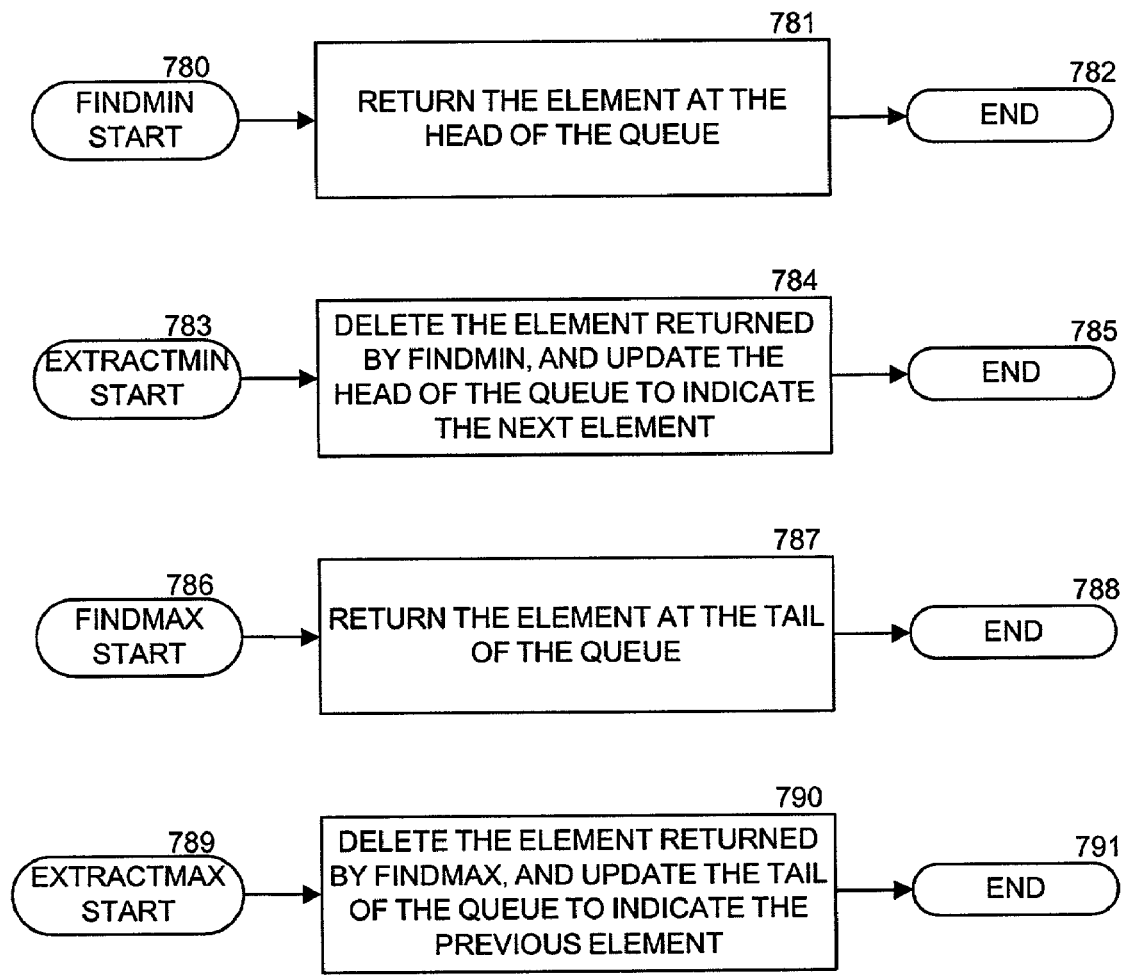

FIG. 7D illustrates various exemplary priority queue operations which can be performed on the sorted set of queue elements 612 (FIG. 6).

Processing of a FINDMIN operation begins at process block 780, and proceeds to process block 781, wherein the element at the head of the queue is returned (e.g., that indicated by head of queue pointer 618), and processing is then completed as indicated by process block 782.

Processing of an EXTRACTMIN operation begins at process block 783, and proceeds to process block 784, wherein the element returned by the FINDMIN operation is returned, and the head of queue pointer (e.g., head of queue pointer 618) is updated to indicate the next queue element, and processing is then completed as indicated by process block 785.

Processing of a FINDMAX operation begins at process block 786, and proceeds to process block 787, wherein the element at the tail of the queue is returned (e.g., that indicated by tail of queue pointer 619), and processing is then completed as indicated by process block 788.

Processing of an EXTRACTMAX operation begins at process block 789, and proceeds to process block 790, wherein the element returned by the FINDMAX operation is returned, and the tail of queue pointer (e.g., tail of queue pointer 619) is updated to indicate the previous queue element, and processing is then completed as indicated by process block 791.

Longest Prefix Match Using an Associative Memory without Using Masks (e.g., on a Cam)

As alluded to herein, a TCAM is an efficient mechanism for determining a longest prefix match, and many of the range and sort operations are implemented in some of the possible embodiments using TCAMs. However, it is also possible to perform a longest prefix match using other types of an associative memory, such as, but not limited to a content addressable memory (CAM), and via any known or future developed mechanism.

For example, one embodiment stores a prefix $Pb^{W-L}$ in a CAM, where W is the width of the associative memory (e.g., CAM), L is the length(P) and b is the bit obtained by inverting the last bit of P, and then iteratively tries all prefixes of the key, starting with the longest possible one, until a match is found. Of course this same technique could also be used in an associative memory that supports masks or natively supports prefix matching operation, but this technique is particularly advantageous for those associative memories that do not support these features.

Figure 8A:
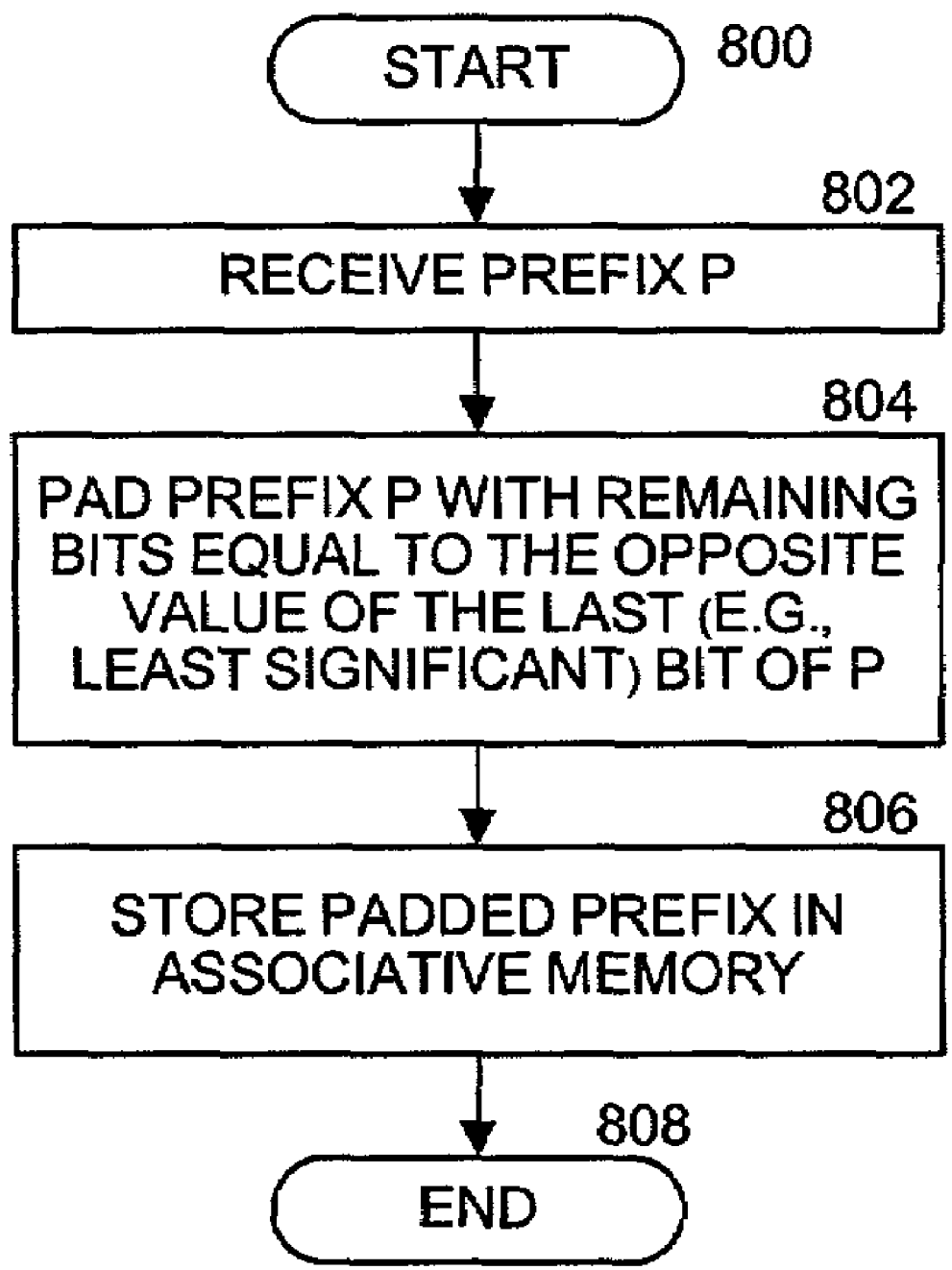
FIGS. 8A-B illustrate flow diagrams of processes used in one embodiment to maintain prefixes in an associative memory, especially one that does not natively support prefixes or masking values, and to identify a longest prefix match in the associative memory based on a lookup word.

FIG. 8A illustrates a process used in one embodiment to add a prefix to the associative memory. Processing begins with process block 800, and proceeds to process block 802, wherein the prefix P is received. Next, in process block 804, prefix P is padded with the remaining bit positions equal to the opposite value of the last (e.g., least significant) bit of P, and in process block 806, this padded prefix is stored in the associative memory. Processing is complete as indicated by process block 808.

Figure 8B:
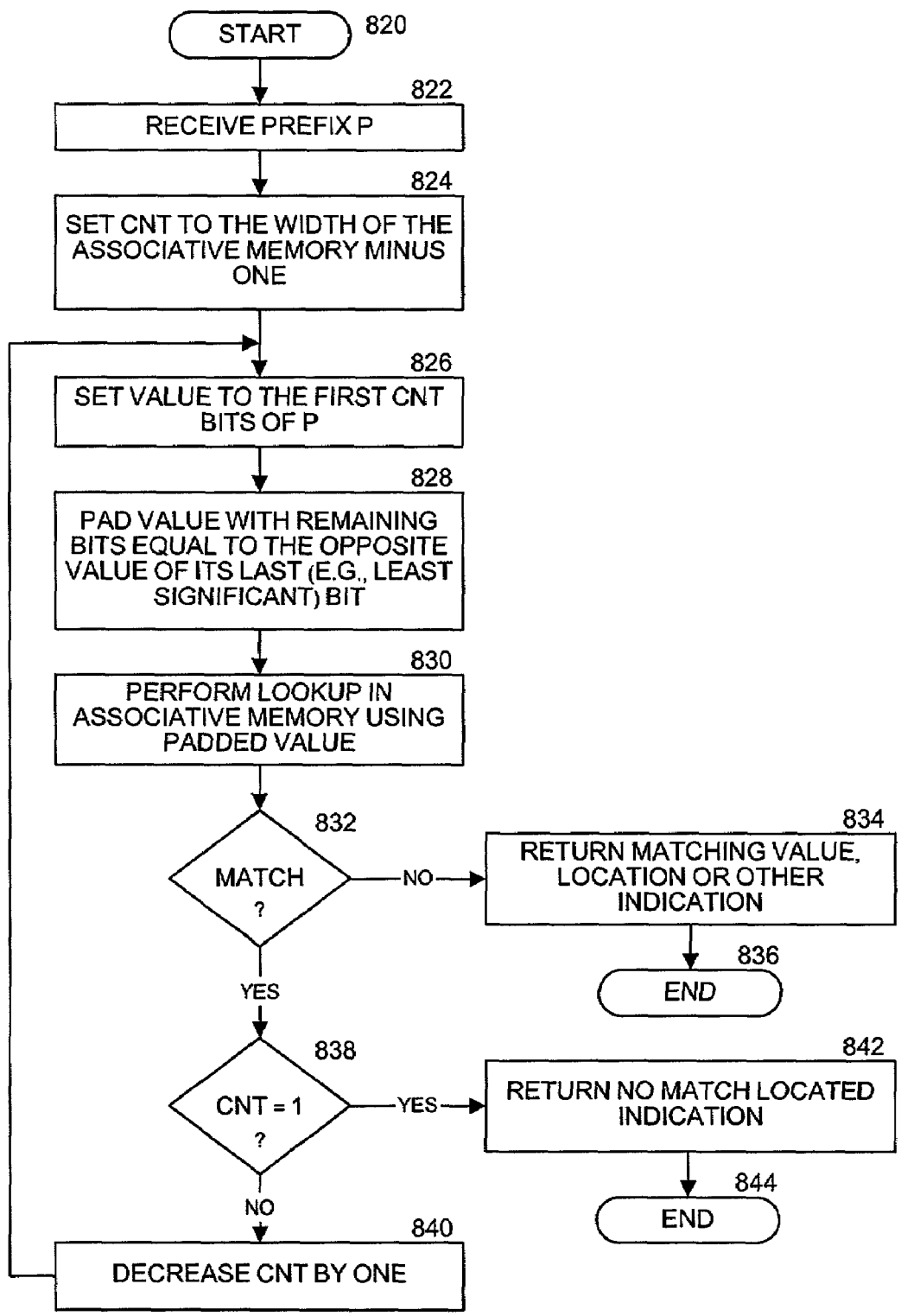

FIG. 8B illustrates a process used in one embodiment to lookup a value in an associative memory stored in the manner such as that illustrated in FIG. 8A. Processing begins with process block 820, and proceeds to process block 822, wherein the prefix P is received. Next, in process block 824, the variable CNT is set to the width of the associative memory being used minus one (i.e., the length of the longest prefix that can be stored using the prefix encoding method). Until either a match is found as determined in process block 832 or CNT is equal to one (e.g., no matching entry in the associative memory) as determined in process block 838, process block 826-830 and 840 are performed to search for a matching entry starting with the longest possible matching prefix and decreasing the search length by one each iteration. In process block 826, the variable VALUE is set to the first CNT number of bits of P. In process block 828, the variable VALUE is padded with the remaining bit positions equal to the opposite value of the last (e.g., least significant) bit of VALUE, and in process block 830, the padded prefix is stored VALUE is used as the lookup word in a lookup operation on the associative memory. As determined in process block 832, if a match is located during this look operation, then in process block 834, the successful returning value, location and/or other indication is returned in process block 834, and processing is complete as indicated by process block 836. Otherwise, as determined in process block 838, if CNT is equal to one, then a no match located indication is returned in process block 842, and processing is completed as indicated by process block 844. Otherwise, in process block 840, CNT is decreased by one, and processing returns to process block 826.

Range Intersection for Possibly Non-Disjoint Ranges

One embodiment determines if a query range intersects one of a set of disjoint and/or non-disjoint ranges by reducing the matching problem to two point intersection problems. For a query range of [X,Y], a point search operation on possibly non-disjoint ranges (e.g., that previously described herein, including the search operation illustrated in FIG. 5C) on Y can be performed on the set of ranges, and if a match is found, then the matching range has been identified. Otherwise, a second set of ranges is searched based on Y, with this second set of ranges being the ranges from zero to the first endpoint, the first endpoint to the second endpoint, and so on. If a matching range [E1,E2] is found, and the value of X is found to be less than the value of the E1, then the matching range has ending point E1 and its corresponding starting point. Otherwise, there is no intersection. In one embodiment, the range intersection search can be performed on a set of possibly non-disjoint ranges using a constant number of operations and using a constant number of associative memory (e.g., TCAM) entries.

Figure 9:
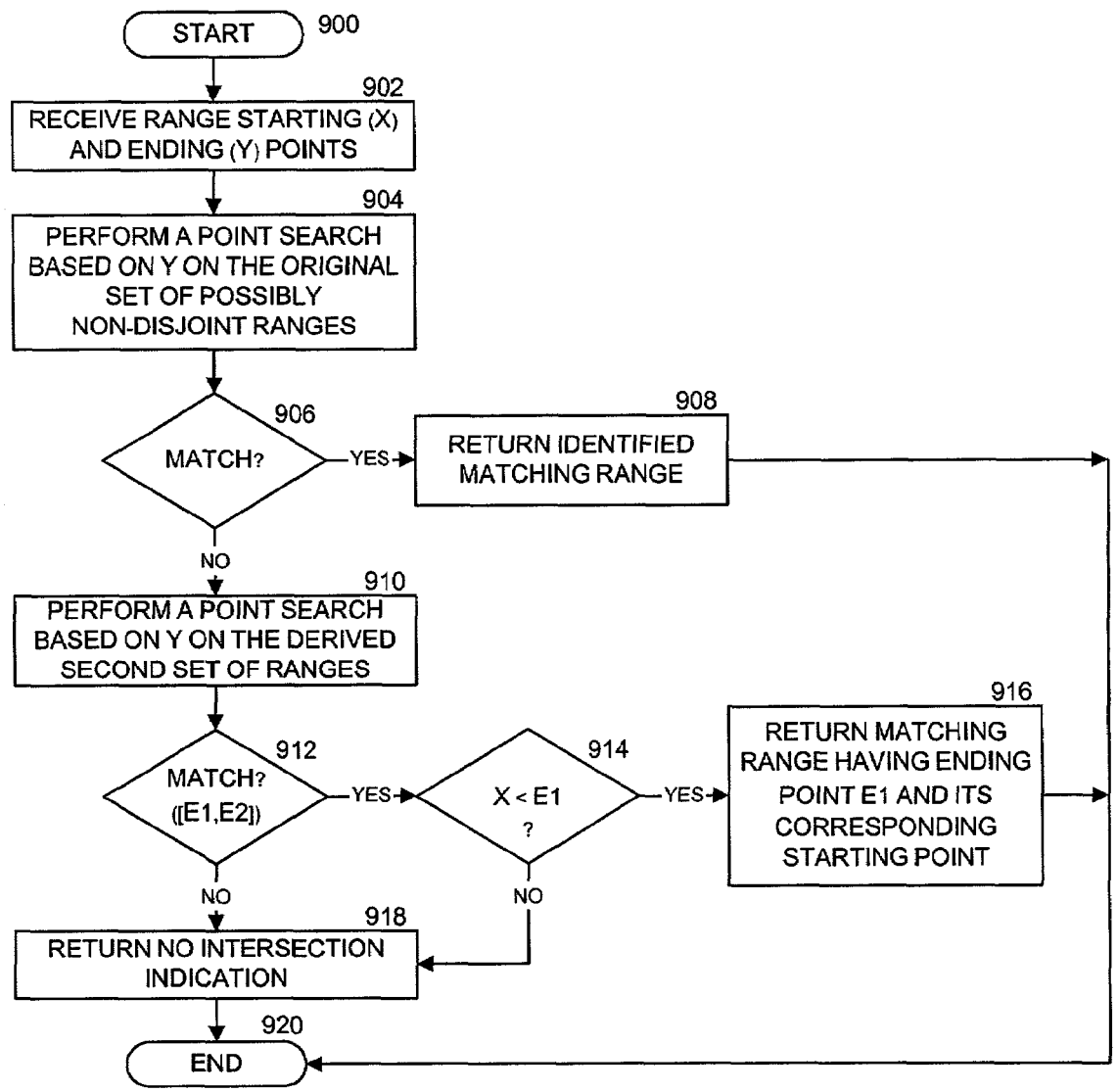
FIG. 9 illustrates a process used in one embodiment for determining a matching range based on a set of possibly non-disjoint ranges.

FIG. 9 illustrates a process used in one embodiment for determining a matching range based on a set of possibly non-disjoint ranges. Processing begins with process block 900, and proceeds to 902, wherein the starting (X) and ending (Y) points of the query range [X,Y] are received. Next, in process block 904, a search operation is performed based on the ending point Y of the received query range [X,Y] on the set of possibly non-disjoint ranges. As determined in process block 906, if a match is identified, then in process block 908, the identified matching range is returned. Otherwise, in process block 910, a second search operation is performed on the derived second set of ranges (e.g., the ranges from zero to the first endpoint, the first endpoint to the second endpoint, and so on.) As determined in process block 912, if a match is found of a range [E1,E2] in the second search operation; then as determined in process block 914, if the value of the starting endpoint X is less than the value E1; then in process block 916, the identified matching range having ending point E1 and its corresponding starting point is returned. Otherwise, no matching range is identified, and in process block 918, an indication of such is returned. Processing is complete as indicated by process block 920.

CONCLUDING REMARK

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method performed in a computerized system for determining a range matching a query point, the method comprising:

determining a longest common prefix of a starting point and an ending point of the range;

extending the longest common prefix by appending a bit to create a particular extended longest common prefix, wherein the bit represents zero or one;

storing the particular extended longest common prefix in a set of extended longest common prefixes; and processing, based on the query point, the set of extended longest common prefixes to identify the range.

2. The method of claim 1, wherein said processing includes searching the set of extended longest common prefixes based on the query point to identify the particular extended longest common prefix.

3. The method of claim 2, wherein said processing further includes comparing the query point with the starting point or the ending point corresponding to the particular extended longest common prefix to determine if the query point is within the range.

4. The method of claim 3, wherein neither the first point nor the second point is a power of two.

5. The method of claim 1, wherein neither the first point nor the second point is a power of two.

6. The method of claim 1, wherein the set of extended longest common prefixes includes a plurality of different extended longest common prefixes corresponding to different ranges.

7. A method performed in a computerized system for determining a range matching a query point, the method comprising:

determining a longest common prefix of a starting point and an ending point of the range;

extending the longest common prefix by appending a one to create a particular one-extended longest common prefix;

storing the particular one-extended longest common prefix in a set of one-extended longest common prefixes;

extending the longest common prefix by appending a zero to create a particular zero-extended longest common prefix;

storing the particular zero-extended longest common prefix in a set of zero-extended longest common prefixes; and processing, based on the query point, the set of one-extended longest common prefixes or the set of zero-extended longest common prefixes to identify the range.

8. The method of claim 7, wherein said processing includes searching the set of one-extended longest common prefixes based on the query point to identify the particular one-extended longest common prefix.

9. The method of claim 8, wherein said processing further includes comparing the query point with the starting or the ending point corresponding to the particular one-extended longest common prefix.

10. The method of claim 7, wherein said processing includes searching the set of zero-extended longest common prefixes based on the query point to identify the particular zero-extended longest common prefix.

11. The method of claim 10, wherein said processing further includes comparing the query point with the starting or the ending point corresponding to the particular zero-extended longest common prefix.

12. An apparatus for determining a range matching a query point, the apparatus comprising:

means for determining a longest common prefix of a starting point and an ending point of the range;

means for extending the longest common prefix by appending a bit to create a particular extended longest common prefix, wherein the bit represents zero or one;

means for storing the particular extended longest common prefix in a set of extended longest common prefixes; and means for processing, based on the query point, the set of extended longest common prefixes to identify the range.

13. The apparatus of claim 12, wherein said means for processing includes means for searching the set of extended longest common prefixes based on the query point to identify the particular extended longest common prefix.

14. The apparatus of claim 13, wherein said means for processing further includes means for comparing the query point with the starting point or the ending point corresponding to the particular extended longest common prefix to determine if the query point is within the range.

15. The apparatus of claim 12, further comprising means for adding a second range to the set of extended longest common prefixes.

16. The apparatus of claim 15, further comprising means for deleting the second range from the set of extended longest common prefixes.

17. The apparatus of claim 12, wherein said means for processing includes an associative memory lookup operation.

18. The apparatus of claim 17, wherein said means for processing includes at most two associative memory lookup operations for a particular query point.

19. The apparatus of claim 12, comprising means for padding a prefix with a value opposite of a last bit of the prefix; and wherein said means for processing includes an content addressable memory lookup operation.

20. A computer-readable storage medium containing computer-executable instructions for performing steps for determining a range matching a query point, said steps comprising:

determining a longest common prefix of a starting point and an ending point of the range;

extending the longest common prefix by appending a bit to create a particular extended longest common prefix, wherein the bit represents zero or one;

storing the particular extended longest common prefix in a set of extended longest common prefixes; and processing, based on the query point, the set of extended longest common prefixes to identify the range.

21. The computer-readable storage medium of claim 20, wherein said processing includes searching the set of extended longest common prefixes based on the query point to identify the particular extended longest common prefix.

22. The computer-readable storage medium of claim 21, wherein said processing further includes comparing the query point with the starting point or the ending point corresponding to the particular extended longest common prefix to determine if the query point is within the range.

23. A method performed in a computerized system for determining a range matching a query range, with the query range including at least two different points, the method comprising:

determining a longest common prefix of a starting point and an ending point of the range;

extending the longest common prefix by appending a bit to create a particular extended longest common prefix, wherein the bit represents zero or one;

storing the particular extended longest common prefix in a set of extended longest common prefixes; and processing, based on the query range, the set of extended longest common prefixes to identify the range.

24. An apparatus for determining a range matching a query range, with the query range including at least two different points, the apparatus comprising:

means for determining a longest common prefix of a starting point and an ending point of the range;

means for extending the longest common prefix by appending a bit to create a particular extended longest common prefix, wherein the bit represents zero or one;

means for storing the particular extended longest common prefix in a set of extended longest common prefixes; and means for processing, based on the query range, the set of extended longest common prefixes to identify the range.

25. The method of claim 24, wherein said processing includes comparing the query endpoint with the starting point or the ending point corresponding to the particular extended longest common prefix to determine if the query range intersects the range.

26. The method of claim 23, wherein the range corresponds to an element of a sorted list.

27. The method of claim 23, wherein the range corresponds to an element of a priority queue.

28. The method of claim 23, wherein the query range includes two different points, and the starting and ending points are different.

29. An apparatus for determining a range matching a query range, the apparatus comprising:

means for determining a longest common prefix of a starting point and an ending point of the range;

means for extending the longest common prefix by appending a bit to create a particular extended longest common prefix;

means for storing the particular extended longest common prefix in a set of extended longest common prefixes; and means for processing, based on the query range, the set of extended longest common prefixes to identify the range.

30. The apparatus of claim 29, wherein the query range is bounded on one side by a query endpoint; and wherein said means for processing includes means for searching the set of extended longest common prefixes based on the query endpoint to identify the particular extended longest common prefix.

31. The apparatus of claim 30, wherein said processing includes: means for comparing the query endpoint with the starting point or the ending point corresponding to the particular extended longest common prefix to determine if the query range intersects the range.

32. The apparatus of claim 29, further comprising means for adding a second range to the set of extended longest common prefixes.

33. The apparatus of claim 32, further comprising means for deleting the second range from the set of extended longest common prefixes.

34. The apparatus of claim 29, wherein said means for processing includes an associative memory lookup operation.

35. The apparatus of claim 34, wherein said means for processing includes at most two associative memory lookup operations for a particular query point.

36. The apparatus of claim 29, comprising means for padding a prefix with a value opposite of a last bit of the prefix; and wherein said means for processing includes an content addressable memory lookup operation.

37. The apparatus of claim 29, wherein the range corresponds to an element of a sorted list.

38. The apparatus of claim 29, wherein the range corresponds to an element of a priority queue.

39. The apparatus of claim 38, comprising means for performing FINDMIN, EXTRACTMIN, FINDMAX, and EXTRACTMAX operations.

40. A computer-readable storage medium containing computer-executable instructions for performing steps for determining a range matching a query range, with the query range including at least two different points, said steps comprising:

determining a longest common prefix of a starting point and an ending point of the range;

extending the longest common prefix by appending a bit to create a particular extended longest common prefix, wherein the bit represents zero or one;

storing the particular extended longest common prefix in a set of extended longest common prefixes; and processing, based on the query range, the set of extended longest common prefixes to identify the range.

41. The computer-readable storage medium of claim 40, wherein the query range is bounded on one side by a query endpoint; and wherein said processing includes searching the set of extended longest common prefixes based on the query endpoint to identify the particular extended longest common prefix.

42. The computer-readable storage medium of claim 41, wherein said processing includes comparing the query endpoint with the starting point or the ending point corresponding to the particular extended longest common prefix to determine if the query range intersects the range.

43. The computer-readable storage medium of claim 40, wherein the range corresponds to an element of a sorted list.

44. The computer-readable storage medium of claim 40, wherein the range corresponds to an element of a priority queue.

45. A method performed in a computerized system for determining a range matching a query point, the method comprising:

determining a longest common prefix of a starting point and an ending point of the range;

identifying a first portion of a band from the starting point to the longest common prefix;

identifying a second portion of the band from the ending point to the longest common prefix;

adjusting one or more right counts and left counts based on the first and second portions of the band;

extending the longest common prefix by appending a bit to create a particular extended longest common prefix;

storing the particular extended longest common prefix in a set of extended longest common prefixes; and processing, based on the query point, the set of extended longest common prefixes to identify the range.

46. The method of claim 45, wherein said processing includes searching the set of extended longest common prefixes based on the query point to identify the particular extended longest common prefix; and comparing the query point with the starting point or the ending point corresponding to the particular extended longest common prefix and inspecting at least one of said one or more right and left counts to determine if the query point intersects the range.

47. The method of claim 45, further comprising updating one or more Tcounts based on the first or second portions of the band.

48. The method of claim 47, further comprising:

adding a particular non-zero Tcount node based on the longest common prefix to a set of non-zero Tcount nodes; and wherein said processing includes searching the set of non-zero Tcount nodes based on the query point to identify the range.

49. The method of claim 45, wherein the starting and ending points are different.

50. An apparatus for determining a range matching a query point, the apparatus comprising:

means for determining a longest common prefix of a starting point and an ending point of the range;

means for identifying a first portion of a band from the starting point to the longest common prefix;

means for identifying a second portion of the band from the ending point to the longest common prefix;

means for adjusting one or more right counts and left counts based on the first and second portions of the band;

means for extending the longest common prefix by appending a bit to create a particular extended longest common prefix, wherein the bit represents zero or one;

means for storing the particular extended longest common prefix in a set of extended longest common prefixes; and means for processing, based on the query point, the set of extended longest common prefixes to identify the range.

51. The apparatus of claim 50, wherein said means for processing includes means for searching the set of extended longest common prefixes based on the query point to identify the particular extended longest common prefix; and means for comparing the query point with the starting point or the ending point corresponding to the particular extended longest common prefix and inspecting at least one of said one or more right and left counts to determine if the query point intersects the range.

52. The apparatus of claim 51, further comprising means for updating one or more Tcounts based on the first or second portions of the band.

53. The apparatus of claim 52, further comprising:

means for adding a particular non-zero Tcount node based on the longest common prefix to a set of non-zero Tcount nodes; and wherein said means for processing includes means for searching the set of non-zero Tcount nodes based on the query point to identify the range.

54. A computer-readable storage medium containing computer-executable instructions for performing steps for determining a range matching a query point, said steps comprising:

determining a longest common prefix of a starting point and an ending point of the range;

identifying a first portion of a band from the starting point to the longest common prefix;

identifying a second portion of the band from the ending point to the longest common prefix;

adjusting one or more right counts and left counts based on the first and second portions of the band;

extending the longest common prefix by appending a bit to create a particular extended longest common prefix, wherein the bit represents zero or one;

storing the particular extended longest common prefix in a set of extended longest common prefixes; and processing, based on the query point, the set of extended longest common prefixes to identify the range.

55. The computer-readable storage medium of claim 54, wherein said processing includes searching the set of extended longest common prefixes based on the query point to identify the particular extended longest common prefix; and comparing the query point with the starting point or the ending point corresponding to the particular extended longest common prefix and inspecting at least one of said one or more right and left counts to determine if the query point intersects the range.

56. The computer-readable storage medium of claim 54, having computer-executable instructions for performing steps further comprising updating one or more Tcounts based on the first or second portions of the band.

57. The computer-readable storage medium of claim 56, having computer-executable instructions for performing steps further comprising adding a particular non-zero Tcount node based on the longest common prefix to a set of non-zero Tcount nodes; and wherein said processing includes searching the set of non-zero Tcount nodes based on the query point to identify the range.

58. An apparatus comprising one or more processors and a memory, wherein the memory stores one or more instructions that, when executed by the one or more processors, perform the steps of:

determining a longest common prefix of a starting point and an ending point of the range;

extending the longest common prefix by appending a bit to create a particular extended longest common prefix, wherein the bit represents zero or one;

storing the particular extended longest common prefix in a set of extended longest common prefixes; and processing, based on the query point, the set of extended longest common prefixes to identify the range.

59. The apparatus of claim 58, wherein said processing includes searching the set of extended longest common prefixes based on the query point to identify the particular extended longest common prefix.

60. The apparatus of claim 59, wherein said processing further includes comparing the query point with the starting point or the ending point corresponding to the particular extended longest common prefix to determine if the query point is within the range.

61. The apparatus of claim 60, wherein neither the first point nor the second point is a power of two.

62. The apparatus of claim 58, wherein the set of extended longest common prefixes includes a plurality of different extended longest common prefixes corresponding to different ranges.

63. The apparatus of claim 62, wherein at least one of the first point or the second point is not a power of two.

64. An apparatus comprising one or more processors and a memory, wherein the memory stores one or more instructions that, when executed by the one or more processors, perform the steps of:
- determining a longest common prefix of a starting point and an ending point of the range;
- extending the longest common prefix by appending a bit to create a particular extended longest common prefix, wherein the bit represents zero or one;
- storing the particular extended longest common prefix in a set of extended longest common prefixes; and
- processing, based on a query range including at least two points, the set of extended longest common prefixes to identify the range.

65. The apparatus of claim 64, wherein the query range includes two different points and the starting and ending points are different.

66. The apparatus of claim 65, wherein the query range is bounded on one side by a query endpoint; and wherein said processing includes searching the set of extended longest common prefixes based on the query endpoint to identify the particular extended longest common prefix.

67. The apparatus of claim 66, wherein said processing includes comparing the query endpoint with the starting point or the ending point corresponding to the particular extended longest common prefix to determine if the query range intersects the range.

68. An apparatus comprising one or more processors and a memory, wherein the memory stores one or more instructions that, when executed by the one or more processors, perform the steps of:
- determining a longest common prefix of a starting point and an ending point of the range;
- identifying a first portion of a band from the starting point to the longest common prefix;
- identifying a second portion of the band from the ending point to the longest common prefix;
- adjusting one or more right counts and left counts based on the first and second portions of the band;
- extending the longest common prefix by appending a bit to create a particular extended longest common prefix;
- storing the particular extended longest common prefix in a set of extended longest common prefixes; and
- processing, based on the query point, the set of extended longest common prefixes to identify the range.

69. The apparatus of claim 68, wherein the starting and ending points are different.

70. The apparatus of claim 69, wherein said processing includes searching the set of extended longest common prefixes based on the query point to identify the particular extended longest common prefix; and
- comparing the query point with the starting point or the ending point corresponding to the particular extended longest common prefix and inspecting at least one of said one or more right and left counts to determine if the query point intersects the range.

* * * * *

UNITED STATES PATENT AND TRADEMARK OFFICE
CERTIFICATE OF CORRECTION

PATENT NO. : 7,558,775 B1
APPLICATION NO. : 10/165590
DATED : July 7, 2009
INVENTOR(S) : Panigrahy et al.

It is certified that error appears in the above-identified patent and that said Letters Patent is hereby corrected as shown below:

Col. 19, lines 30-42, replace Claim 24 with the following text:
-- 24. The method of claim 23, wherein the query range is bounded on one side by a query endpoint; and wherein said processing includes searching the set of extended longest common prefixes based on the query endpoint to identify the particular extended longest common prefix. --

Signed and Sealed this

Twenty-third Day of February, 2010

David J. Kappos
*Director of the United States Patent and Trademark Office*